United States Patent
Kryachko

(10) Patent No.: US 10,002,456 B2
(45) Date of Patent: Jun. 19, 2018

(54) WATER SURFACE RENDERING IN VIRTUAL ENVIRONMENT

(71) Applicant: Wargaming.net Limited, Nicosia (CY)

(72) Inventor: Yury Kryachko, Moscow (RU)

(73) Assignee: Wargaming.net Limited, Nicosia (CY)

( * ) Notice: Subject to any disclaimer, the term of this patent is extended or adjusted under 35 U.S.C. 154(b) by 0 days. days.

(21) Appl. No.: 15/631,936

(22) Filed: Jun. 23, 2017

(65) Prior Publication Data
US 2018/0012392 A1    Jan. 11, 2018

Related U.S. Application Data

(60) Provisional application No. 62/360,013, filed on Jul. 8, 2016.

(51) Int. Cl.
| | |
|---|---|
| G09G 5/00 | (2006.01) |
| G06T 15/00 | (2011.01) |
| G06T 17/20 | (2006.01) |
| G06F 17/16 | (2006.01) |
| G06T 15/80 | (2011.01) |
| G06T 15/06 | (2011.01) |
| G06T 15/04 | (2011.01) |

(52) U.S. Cl.
CPC ............ *G06T 15/005* (2013.01); *G06F 17/16* (2013.01); *G06T 17/20* (2013.01); *G06T 15/04* (2013.01); *G06T 15/06* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 9,147,283 B1* | 9/2015 | McVey | G06T 17/00 |
| 2004/0181382 A1* | 9/2004 | Hu | G06T 13/60 |
| | | | 703/9 |
| 2008/0177519 A1* | 7/2008 | Miller | G06T 13/60 |
| | | | 703/9 |

OTHER PUBLICATIONS

Kryachko, Yury, "Using Vertex Texture Displacement for Realistic Water Rendering," GPU Gems 2 Programming Techniques for High-Performance Graphics and General-Purpose Computation, 2005, pp. 283-294.

(Continued)

*Primary Examiner* — Frank Chen
(74) *Attorney, Agent, or Firm* — Banner & Witcoff, Ltd.

(57) ABSTRACT

Aspects described herein may provide improved water surface approximation by correcting a polygonal mesh (such as a projected grid mesh) at pixel and/or sub-pixel levels through application of a novel ray-casting method based on a modified version of Newton's method for finding roots. The ray-casting method may refine an initial condition determined based on the polygonal mesh and may iteratively develop a more accurate approximation of the water surface as described further herein. This improved approximation method may be suitable for both low-end and high-end GPUs. Due to lower computational complexity, the method may be utilized by low-end GPUs to improve quality while maintaining performance. The method may also be further enhanced with more advanced features such as low-cost multisampling anti-aliasing on higher-end GPUs to provide superior visualization of water surfaces and take full advantage of the additional processing power of such systems.

20 Claims, 16 Drawing Sheets

(56) References Cited

OTHER PUBLICATIONS

Johanson, Claes, "Real-time water rendering Introducing the projected grid concept," Master of Science thesis, Lund University, Mar. 2004, 42 pages.
Eric Bruneton, Fabrice Neyret, Nicolas Holzschuch. Real-time Realistic Ocean Lighting using Seamless Transitions from Geometry to BRDF. Computer Graphics Forum, Wiley, 2010, 29 (2), pp. 487-496. <10.1111/i.1467-8659.2009.01618.x>. <inria-00443630v3>.
Yuksel, Gem, "Real-Time Water Waves with Wave Particles," A Dissertation Submitted to the Office of Graduate Studies of Texas A&M University, Aug. 2010, 221 pages.
Gjel, Mikkel et al., "The Rendering of Inside High Fidelity, Low Complexity," 187 pages.
Tevs, Art et al., "Maximum Mipmaps for Fast, Accurate, and Scalable Dynamic Height Field Rendering," Max-Planck-Institut für Informatik, 8 pages.
Kasyan, Nickolay et al., "Secrets of CryENGINE 3 Graphics Technology," Crytek, SIGGRAPH2011, 73 pages, 2011.
Puzynin, I., "Continuous analog of the Newton method," retrieved from <http://www1.jinr.ru/Archive/Pepan/1973-v4/v-4-1/v4p1pdf_obzory/v4_1_4.pdf>, 40 pages.
Kryachko, Yury, "Sea Surface Visualisation," Wargaming.net, World of Warships, Jul. 2016, Siggraph 16, 66 pages.
Oiana, Marc, "LEAN Mapping", I3D 2010: Proceedings of the ACM SIGGRAPH Symposium on Interactive 3D Graphics and Games, (Washington, DC, Feb. 19-21, 2010).

\* cited by examiner

1050  For each visible water pixel
1051      Calculate refraction ray R = WavePos + RefractDir * t
1052      Calculate casting parameters
1053      Set volumeShadowSum = 0
1054      For k=0,..,VolumeSamples – 1 Do
          {
1055          t = JitteredRayPos( PixelPos , k )
1056          w = AttenuationOfShadow(t) * distance(JitteredRayPos(PixelPos, k), JitteredRayPos(PixelPos, k+1);
1057          samplePos = shadowMapTransform(worldPos(t));
1058          randomOffset = RotatedPoissonDisc(PixelPos, k) * minBlurRadius * (1.0 + distanceFromWaterSurface * distBlurIncrement);
1059          volumeShadowSum += sampleShadowMap (samplePos + randomOffset) * w;
1060          sumWeight += w;
          }
1061      volumeShadow = (volumeShadowSum / sumWeight – 1) * volumeShadowIntensity + 1
1062  End For

*FIG. 10B*

WATER SURFACE RENDERING IN VIRTUAL ENVIRONMENT

CROSS-REFERENCE TO RELATED APPLICATIONS

This application claims priority as a non-provisional of U.S. Prov. Pat. App. Ser. No. 62/360,013, entitled "Water Surface Rendering in Virtual Environment," filed on Jul. 8, 2016, the entirety of which is incorporated herein by reference.

FIELD

Aspects of the disclosure relate to computing hardware and computer software. In particular, one or more aspects of the disclosure generally relate to computing hardware and computer software for providing enhanced computer graphics, such as in the rendering of water surfaces in virtual environments.

BACKGROUND

Video games allow users to experience rich virtual environments spanning any number of settings and contexts. These virtual environments may be rendered and displayed using three-dimensional graphics hardware, such as a dedicated graphical processing unit (GPU). However, the detail of these virtual environments has always been limited by the state of computer graphics hardware and practical expectations. When determining an appropriate level of detail and realism to use in implementing the virtual environment, game developers consider the capabilities of the hardware that will run the video game as well as user expectations regarding performance. This usually results in a balance between rendering a suitable level of detail while still maintaining an acceptable frame rate. As new hardware and techniques become available, video games may present ever more detailed and realistic environments.

In video games taking place on or near a body of water, such as the sea, the surface of the water and related details are among the most prominent elements for the emotional and visual impact of the virtual environment and associated game play. Water has traditionally been recognized as one of the more difficult features to render in virtual environments. Unlike land and other objects, water (and other fluids) behaves as a dynamic volumetric entity. Accurate depiction may require frame-by-frame calculation of changes in the water's surface. Further, water is generally transparent and realistic depiction of water may require complex calculations relating to the interaction of light with the surface of water in the form of reflections, refraction, and shadows. It is difficult to achieve realistic quality and suitable performance simultaneously in water visualization due to complicated optical effects and dynamic variability. However, modern gamers demand increasingly detailed virtual environments but are not willing to sacrifice performance.

Existing methods for visualizing waves on water surfaces suffer from various problems resulting in a lack of wave texture detail at distance, instability of polygonal mesh when the observer is moving, and unrealistic optical effects. One wave rendering method is the Projected Grid method described by Claes Johanson in "Real-time Water Rendering: Introducing the Projected Grid Concept," [Lund University, 2004], the content of which is incorporated herein by reference. The Projected Grid method takes a uniform grid at the observer's location and projects it along the camera's view to a base plane of the water surface. This grid is then adjusted based on a height field associated with the water surface to generate a polygonal mesh approximating the water surface. However, the Projected Grid method does not provide good detail of waves at distances far from the observer and does not offer stability when the observer point is moving. Further, the Projected Grid method does not adapt a detalization level to allow high quality rendering of dynamic water deformation.

Another complication is the wide range of computer graphics hardware available to gamers and other end-users. To appeal to a broader market, video games are often designed to run on many different hardware configurations having varied capabilities. Developers may choose to implement certain techniques when the user has a high-end GPU and use other, less advanced, techniques when the user has a lower-end GPU (or has selected a corresponding graphics setting preset, for example). Existing implementations often use different techniques for low- and high-end graphics presets. They may also use different techniques for regions that are near and far from the viewpoint. For example, one technique that may be used in high-end graphical presets is Fast Fourier Transform wave synthesis based on oceanographic statistics for surface wave models. However, this model does not provide sufficient quality for low-end GPUs (at suitable performance levels). Games using this technique usually implement another technique for low-end GPUs and for points at greater distances from the observer. This requires additional synchronization of different content for various views and hardware configurations. Mixing techniques and utilizing different rendering processes for high and low end GPUs may result in additional complexity of the game software and may present synchronization issues, raising the cost of content production for the game developer.

Existing methods may render objects in the virtual environment by projecting polygonal approximations of the surfaces of the objects into a 2D display. However, using such techniques it may be difficult to achieve high quality polygonal approximation of the water surface in real time because it requires extremely tiny polygons (which are difficult to process on current hardware). Further, existing techniques may not be flexible to adapt to rapid and dynamic changes of the water surface. Accordingly, there exists a need for improved techniques that provide high-quality and realistic rendering of water surfaces in virtual environments but are able to still provide suitable performance on both high- and low-end GPUs.

SUMMARY

Aspects of the disclosure provide improved visualization of water surfaces in virtual environments for real-time 3D applications. In particular, some aspects may be highly scalable for a range of 3D graphics hardware and may provide quality at close, middle, and far distances from an observer's location in the virtual environment. Aspects described herein may provide improved stability of water geometry during motion of an observer point or dynamic waves animation, provide improved detail on waves and other disturbances in the water surface, and minimize the appearance of repetitive wave patterns. Aspects may also provide realistic optical effects such as reflections, deformations, shadows, and foam effects.

Implementation of one or more aspects described herein may improve the quality and realism of a rendered water surface in a virtual environment displayed by a computing device. These techniques may noticeably improve the functionality of the computing device by allowing the computing device to generate a more realistic depiction of water in the virtual environment, thereby providing an improved user experience. The solutions described herein may improve quality of low precision polygonal approximation in generating a high quality display of a water surface, providing increases in performance through more efficient use of computing resources (such as polygon budgets during rendering).

Aspects described herein may provide improved water surface approximation by correcting a polygonal mesh (such as a projected grid mesh, tessellated mesh, or other suitable polygonal approximation) at pixel and/or sub-pixel levels through application of a novel ray-casting method based on a modified version of Newton's method for finding roots. The ray-casting method may refine an initial condition determined based on the polygonal mesh and may iteratively develop a more accurate approximation of the water surface through convergence of the modified Newton's method as described further herein. This improved approximation method may be suitable for both low-end and high-end GPUs. Due to lower computational complexity, the method may be utilized by low-end GPUs to improve quality while maintaining performance. The method may also be integrated with more advanced features such as shader-based multisampling anti-aliasing on higher-end GPUs to provide superior visualization of water surfaces and take full advantage of the additional processing power of such systems.

Other aspects described herein may provide an alternative to hardware mip-mapping and offer improved calculations of optical effects and less noticeable repeated patterns on the water surface. Synthesis of waves without using hardware mip-mapping for waves textures may reduce visibility of repeated patterns at a far distance from an observer and may improve the quality of normal vectors used in lighting calculations relative to the water surface. However, this benefit may come at the cost of increased noise in the rendered image. This increased noise may be suppressed through anti-aliasing, and the particular anti-aliasing algorithm utilized may be tailored to smooth out the increased noise. Aliasing effects may be eliminated by averaging multiple samples of the most frequently changing components in the visualization of the water surface. The combination of wave synthesis without mip-mapping and a multisample anti-aliasing algorithm may provide improved wave details on the water surface at locations near the observer while providing better lighting quality at further distances.

Still other aspects described herein may provide improved optical effects on the visualized water surface. Representation of reflections may be improved based on the calculation of texture coordinates by the ray-casting method described above, alone and/or when further improved with multisampling anti-aliasing. The texture coordinates used in sampling reflection textures may be calculated using a projection of the reflection vector on the far clip plane of the reflection camera. Deformations of the water surface may be computed and visualized based on a combination of special particles (height and/or foam) to provide a high speed rendering technique which may simplify content development and allow higher resolution deformations than in other wave simulation methods.

Visualization of shadows may be improved by taking into account one or more additional volumetric components based on the behavior of the volume of water below the surface responsible for underwater light scattering. Volumetric shadow components may be calculated based on raycasting, taking samples along a refracted ray starting at the world position on the water surface corresponding to a given pixel. These samples may be summed and weighted, yielding a realistic volumetric shadow component. The volumetric shadow component may be utilized in lighting and color calculations to adjust the appearance of underwater visual effects to take into account shadows cast under water by objects in or above the water.

Although described herein with reference to water surfaces, it should be understood that aspects described herein may be equally applied to visualization of any other fluids in the virtual environment. Techniques and features described herein may be utilized to render virtual environments comprising any sort of dynamic fluid volume, particularly where the fluid is partially- or fully-transparent and where visualization of the fluid involves the computation of complex optical effects relative to a surface of the fluid.

BRIEF DESCRIPTION OF THE DRAWINGS

The present disclosure is illustrated by way of example and not limited in the accompanying figures in which like reference numerals indicate similar elements and in which:

FIGS. 10A and 10B depict an illustrative environment and pseudocode for computing shadow effects according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to providing improved visualization of water surfaces in virtual environments for real-time 3D applications. Aspects may provide an improved approximation of the first true intersection between a ray cast through a given pixel of the visualization and the water surface of the virtual environment (that is, an intersection of the ray with the water surface that is closest to the view point—although there may be several intersections of the ray with the water surface, aspects herein are directed to determining the first true intersection). The initial approximation generated by a projected grid (or any polygonal mesh approximating the wave contours, such as a tessellated mesh) may be iteratively improved using an approximation function, as described further herein. The projected grid results may be used as initial conditions, and approximation errors may be corrected by a fast ray casting technique using an iterative approximation function. The iterative approximation function may, in some implementations, comprise additional features to improve convergence of the approximation function. By generating an improved approximation of the first true intersection (closest to point of view) and thus a world position corresponding to a given pixel, embodiments may be able to generate more accurate and realistic visualizations of water surfaces in virtual environments. Further, aspects described herein may improve dynamic stability of the approximation of the water surface. This may reduce geometric aliasing effects where waves pop and shake when the viewpoint moves.

Before discussing these concepts in greater detail, however, several examples of a computing device and network environment in which one or more aspects described herein may be implemented will first be discussed with respect to FIG. 1.

Figure 1:
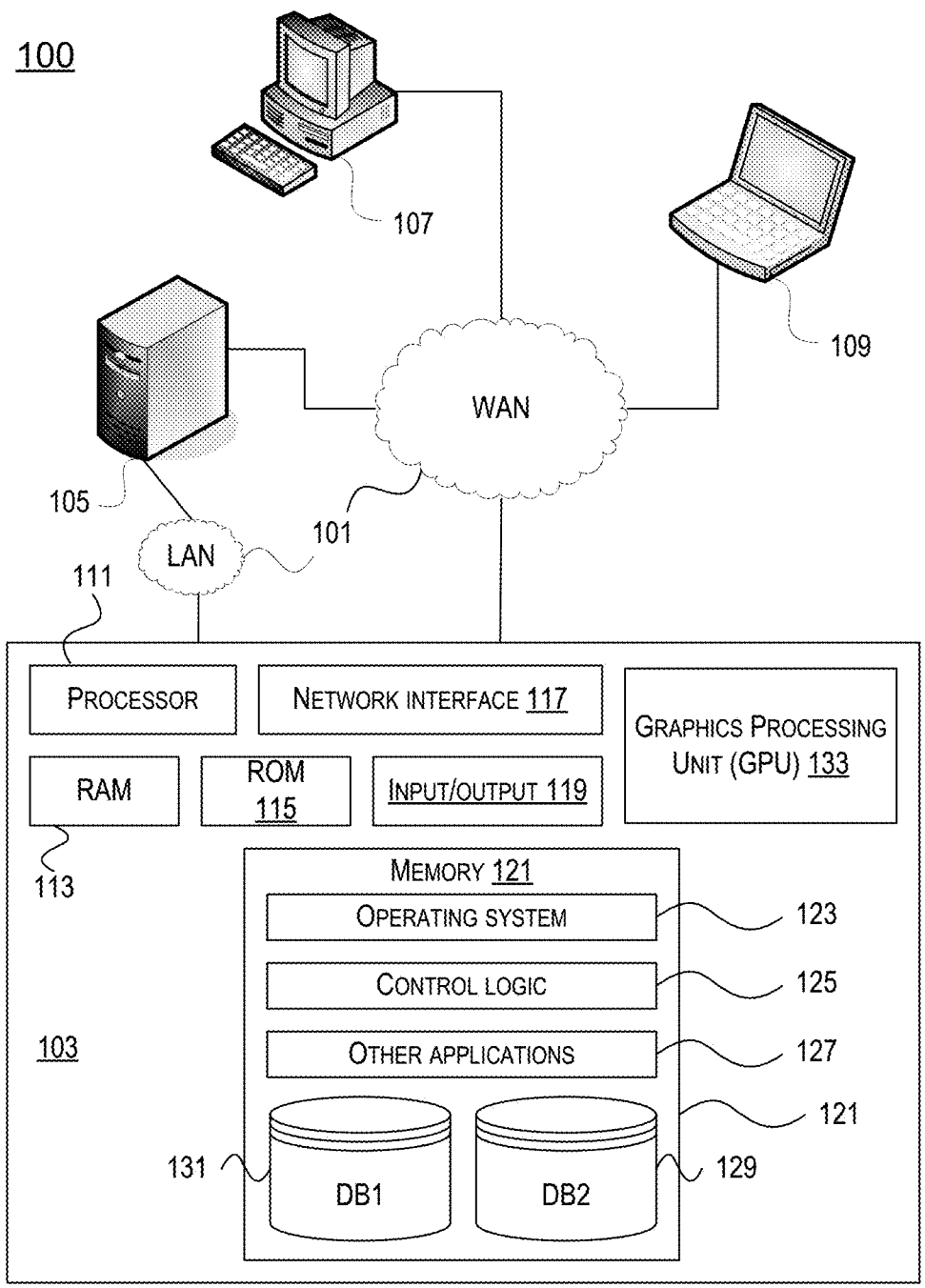
FIG. 1 depicts an example of a network environment that may be used in accordance with one or more illustrative aspects discussed herein.

FIG. 1 illustrates a network environment 100 and computing device 103 in which one or more aspects described herein may be implemented. Clients in network environment 100 may interact with virtual world servers 105 to provide a virtual world for users to access. Clients in network environment 100 may include a variety of devices including computing device 103, personal computer (PC) 107, laptop, portable, or netbook computer 109, personal data assistants, mobile phones or devices, tablet devices, and the like. Each of the clients in network environment 100 may have a network adapter (and software) that allows the clients to connect to virtual world servers 105 through network 101. In one example, network 101 may include an Internet Protocol (IP) based network, e.g., the Internet. Other networks may include cellular networks, cable networks, fiber optic networks, wireless networks, wired network and/or combinations thereof. Network 101 may further include one or more sub-networks such as wired or wireless local area networks (LANs), wide area networks (WANs), and the like.

Computing device 103 may be operative to provide a user with access to a virtual world by generating and rendering a visualization of the virtual environment in the virtual world. Computing device 103 may include a variety of components and modules including a processor 111, random access memory (RAM) 113, read only memory (ROM) 115, network interface 117, input/output controllers 119. Computing device 103 may further include memory 121 (e.g., a magnetic disk or solid state hard drive, or equivalent), which may include operating system software 123, control logic and client software 125, other applications 127, and/or databases 129 and 131. Object database 131 may be configured to store data defining and otherwise associated with attributes of an account of a user of device 103, including objects which the user may utilize to explore and interact with the virtual world. World database 129, on the other hand, may be configured to store data for defining and generating the virtual environment in which the objects exist. For example, world database 129 may store texture maps for rendering a floor or ground, walls, a sky and the like. In another example, world database 129 may store simulated environments, buildings, trees and other data defining animate or inanimate objects existing in the world, data defining computer controlled characters and the like. Each of databases 129 and 131 may be implemented in a range of suitable formats, such as a conventional database. In some embodiments, databases 129 and 131 may instead refer to data stored in a memory, which is accessed as needed by the client software. Data associated with an object or the virtual world may be communicated between computing device 103 and a virtual world server 105 using network interface 117. For example, object positions, attributes and status may be updated or environments may be changed by communicating such data through interface 117.

According to various aspects described herein, a video game may provide a graphically simulated virtual world or virtual environment, in which the game takes place, referred to herein interchangeably as a virtual world and as a virtual environment of the video game. The virtual environment may have features similar to actual geographic locations or may have fictional, science fiction, or fantasy-themed environments.

The virtual world and objects therein may be graphically rendered by client software 125 and subsequently sent to output controller 119 for display on a monitor or other display associated with computing device 103. The client software 125 may be configured to generate three dimensional (3-D) models of the virtual world and components thereof as well as the object corresponding to a user. A user may control the object and interact with the virtual environment through input controller 119 using various types of input devices, such as a keyboard, a mouse, and/or touch sensors that sense when a user has pressed his or her finger at various locations on a touchscreen display associated with computing device 103. Other types of input devices may include a microphone (e.g., for voice communications over the network 101), joysticks, motion sensing devices and/or combinations thereof. In one or more arrangements, music or other audio such as speech may be included as part of the virtual world. In such instances, the audio may be outputted through output controller 119.

Computing device 103 may include a graphics processing unit (GPU) 133. In some embodiments, GPU 133 is discrete hardware component in computing device 103. In other embodiments, GPU 133 may be integrated as part of processor 111. Client software 125 may control GPU 133 to generate and render a three-dimensional visualization of the virtual environment associated with the virtual world. GPU 133 may be adapted to perform specific graphic processing functions and may be optimized for certain types of calculations associated with graphic processing.

Client software 125, computer executable instructions, and other data used by processor 111 and other components of computing device 103 may be stored in and/or by RAM 113, ROM 115, memory 121 or a combination thereof. Other types of memory may also be used, including both volatile and nonvolatile memory. Software executed on computing device 103 may provide instructions to processor 111 such that when the instructions are executed, processor 111, computing device 103, and/or other components thereof are caused to perform functions and methods described herein. Client software 125 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Features described herein may be used with or in a variety of video games, including but not limited to, WORLD OF WARSHIPS® by Wargaming.net®. Aspects described herein may also be used with other video games and are not limited to any one genre or implementation. Aspects described herein may be implemented in video game application software stored on a computer readable medium, such as memories 113, 115, and/or 121, and executable by a data processing device, such as computing device 103.

Having discussed several examples of computing devices, network environments, virtual world clients, and virtual world servers that may be used in implementing various aspects of the disclosure, a number of embodiments will now be discussed in greater detail. In particular, and as introduced above, some aspects of the disclosure generally relate to providing improved visualization of water surfaces in virtual environments for real-time 3D applications. In the description below, various examples illustrating how such improved visualizations may be provided in accordance with one or more illustrative embodiments will be discussed.

Figure 2A:
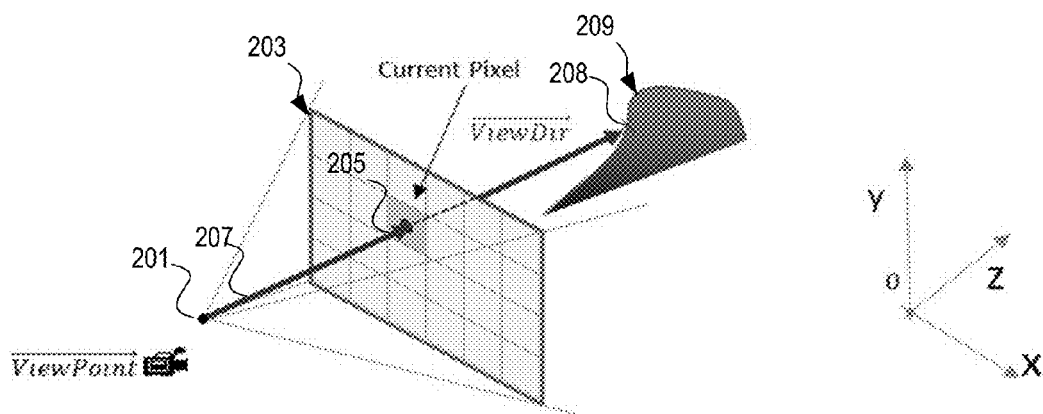
FIGS. 2A-2C depict illustrative representations of a virtual environment having a fluid surface, according to one or more aspects discussed herein.

With reference to FIG. 2A, visualization and rendering of virtual environments may comprise a translation of a three-dimensional model of the virtual environment 209 to a flat two-dimensional scene 203 corresponding to an observer's point of view 201. The 2D scene may be a display made up of many pixels 203, and the computing device may determine visual content for each pixel of the scene before a complete visualization can be rendered. To determine visual content for a given pixel the computing device determines a corresponding position within the world and assigns visual characteristics to the pixel based on attributes of the determined position. Correspondence between a given pixel and a position within the virtual environment 209 may be determined by finding the closest intersection of a ray cast from the view point 201 through the pixel and one or more model(s) associated with virtual environment 209. For example, pixel 205 may be determined to correspond to position 208 on the surface of the virtual environment 209 based on a ray 207 drawn from the view point 201 through pixel 205. Hardware depth buffer techniques may be used to project objects in the virtual world and facilitate identification of a closest intersection with an object surface. By performing this analysis for each pixel of display 203, the computing device may construct a complete visualization of the virtual environment 209 from the observer's view point 201.

In some embodiments, the virtual environment 209 may comprise a vast ocean stretching from the viewer's location to the horizon. The surface contours of virtual environment 209 may, for example, be defined based on simulated waves in the ocean. For example, the ocean may be relatively flat or include heavy swells. The dynamic simulation of ocean waves may be defined using a combination of specialized height maps with different space and time scales. The height maps may define a height of the water's surface at a given time moment and the position in the virtual environment relative to a base plane of the water. Use of height maps to simulate waves in water simulations is described by the inventor in "Using Vertex Texture Displacement for Realistic Water Rendering," GPU Gems 2, 283-294 (Kryachko, 2005), the disclosure of which is incorporated herein by reference. Height maps are in some aspects similar to Fourier harmonics, but may be faster due to requiring fewer harmonics to construct dynamic ocean wave patterns. Height maps may be procedurally generated based on noise-generating function using parameters that correspond to the intended level of wave activity. Multiple height maps may be generated based on a range of parameters, and the multiple height maps may be combined (e.g. superposed) to generate a realistic and dynamic wave pattern.

Accurately visualizing the contours of a water surface in a virtual environment having a realistic and dynamically changing wave pattern may be computationally complex. Existing approaches often use spectral waves synthesis to define the contours of the water surface and a standard projected grid technique for mesh approximation, but they quickly become infeasible in the context of real-time rendering on a variety of platforms, where typical goals include a good quality of water visualization at a distance while also providing a solution suitable for low-end systems. Rendering solutions in video game software typically aim to provide as much detail as possible while maintaining suitable frame rates.

In order to address this problem, virtual environments may be represented in memory as a rendered polygonal mesh approximating the exact contours of the water surface that are defined by the height map. The computing device may utilize this polygonal mesh to assist in determining the visual characteristics of each pixel by ray casting as described above. The polygonal mesh may be rendered such that it has more detail (e.g. resolution) for locations close to the view point 201 while using less detail for locations further away. As described above, one such method for generating a polygonal mesh is the Projected Grid method which takes a uniform grid at the view point and projects it along the camera's view to a base plane of the water surface. This grid is then adjusted based on a height map associated with the water surface to generate a polygonal mesh approximating the water surface. The projected grid method can be used to yield coarse results that roughly approximate the world positions corresponding to each pixel in the display.

Figure 2B:
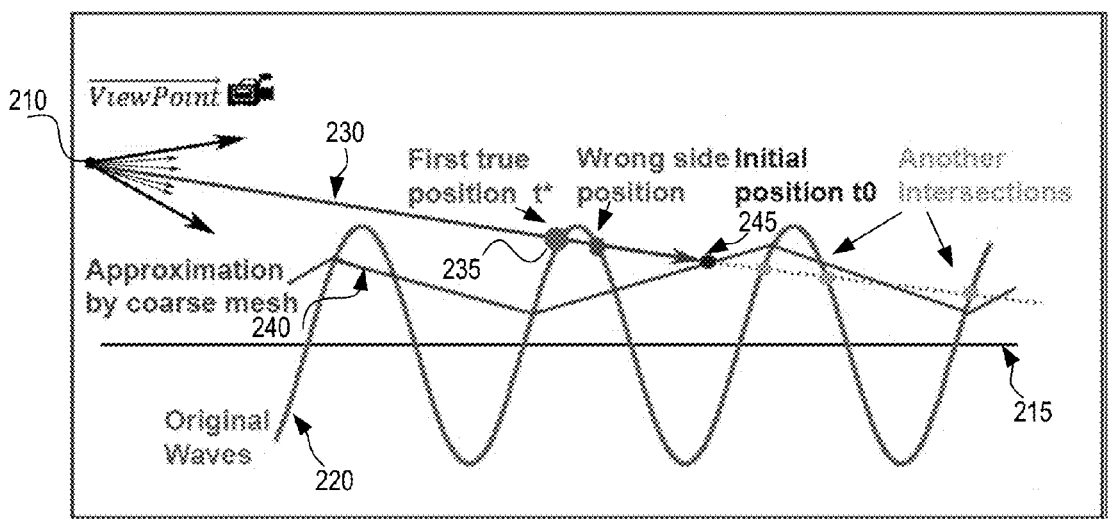

FIG. 2B illustrates the weakness of relying solely on the coarse approximations of the projected grid method. In constructing the camera view from observer point 210, the computing device may determine a world location corresponding to each pixel of the camera view as described above with respect to FIG. 2A. A base plane of the water surface 215 may be defined in the virtual environment. Original wave contours 220 may be defined using, for example, height maps indicating the height of the water surface at a given location relative to the base plane 215. The computing device may generate a projected grid approximation 240 (an approximation by coarse mesh) of the water surface and use this approximation to determine world positions corresponding to each pixel.

In the example illustrated, ray 230 corresponds to a pixel being processed. The computing device casts ray 230 from the observer point 210 through the pixel and determines an intersection with the projected grid approximation 240. The ray 230 intersects the approximation 240 at point 245 (initial point to). The computing device may use the features of point 245 to determine the visual characteristics of the pixel. However, this approximation leads to a potentially bad result as the first true intersection 235 (first true position t*) of the ray with the original waves 220 is on a different wave, and at a different location on that wave. This may result in significant inaccuracies in the visual characteristics of the pixel, as true position 235 may have very different attributes from approximated position 245. For example, visualization of true position 235 near the top of a wave may include simulated foam and churn characteristics of wave crests, while approximated position 245 may have the characteristics of clear water in the middle of a wave.

Visualization of virtual environments may incorporate mip-mapping, wherein a texture or other image may be precomputed and stored at varying levels of resolution. As the requisite level of detail decreases, such as at points further from the observer, the system may utilize lower resolution data from the mip-map while still maintaining a suitable amount of detail. Hardware mip-mapping implemented in GPUs generally works effectively for color textures, reducing image aliasing and accelerating rendering by reducing the texture cache misses. However, for height maps it may be difficult to build a suitable algorithm for constructing mip-map data having levels which will allow the system to accurately calculate optical effects in areas distant from the observer. Hardware mip-mapping may produce unsatisfactory results when applied to height maps as mip-map averaging may reduce high peaks, provide less detailed altitude data at each successive step down in resolution, and may eventually result in a flat plane for the surface of the water at the lowest level of detail. Further, mip-maps are generally not suitable for use with high-quality height map gradients (normals) in calculations of lighting and other features. In particular, mip-maps may introduce a lack of detail that is unsuitable for the geometry refining approximations discussed herein. For example, some embodiments may utilize normal vectors of the water surface at locations distant from the view point in calculating optical effects for those locations, and mip-maps may not provide accurate information for use in these calculations. Other alternatives to mip-mapping for height information, such as statistically based approaches like Bruneton, Neyret, "Realtime Realistic Ocean Lighting using Seamless Transition from Geometry to BRDF," in Computer Graphics Forum 29, pp. 487-496 (2010), and Olano, Marc, "LEAN Mapping", I3D 2010: Proceedings of the ACM SIGGRAPH Symposium on Interactive 3D Graphics and Games, (Washington, D.C., Feb. 19-21, 2010) may yield high quality results, but they require complicated pre-calculations. Such techniques may be ineffective for dynamic wave synthesis as described herein.

Figure 2C:
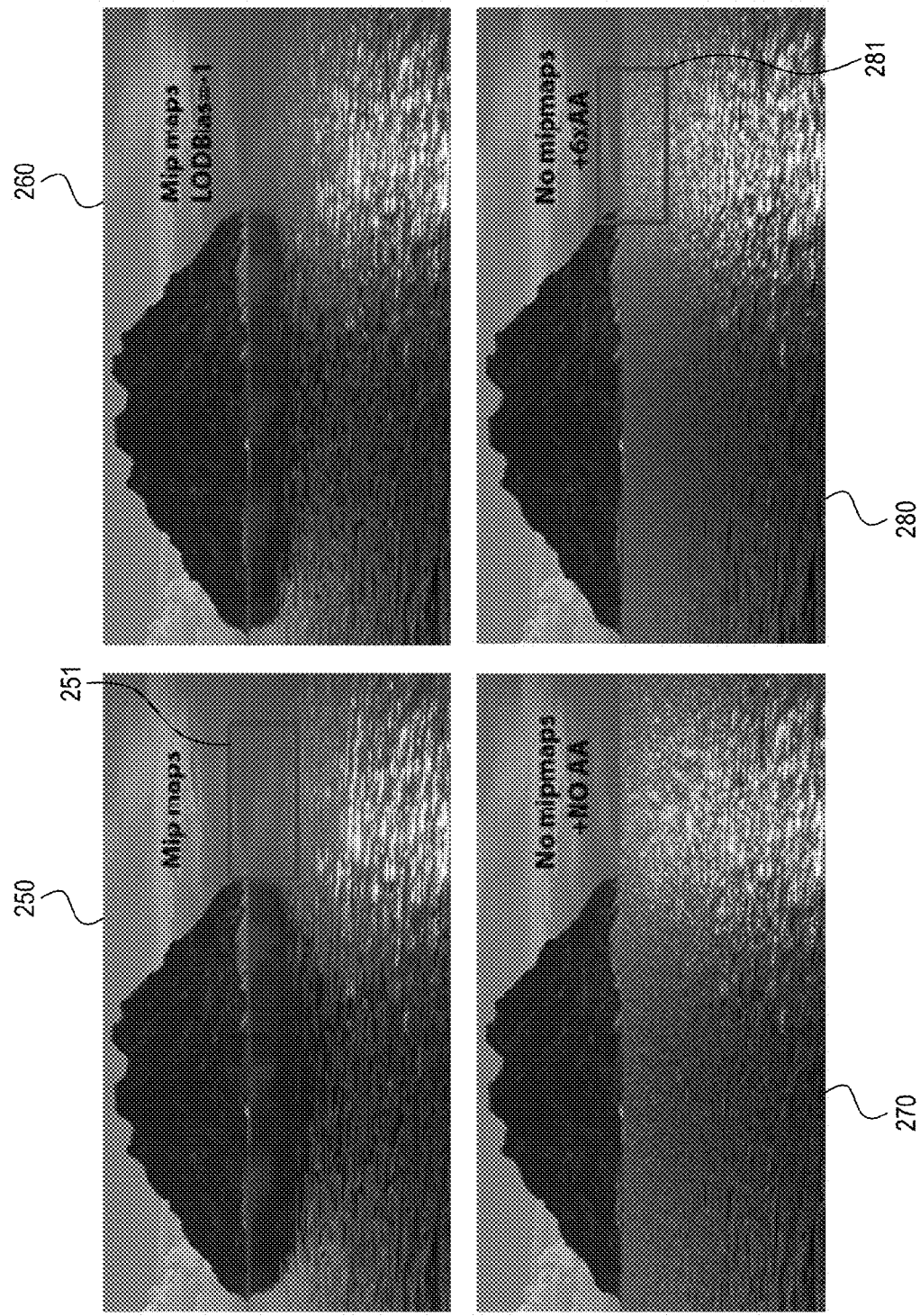

FIG. 2C illustrates illustrative visualizations of a water surface using various techniques. Image 250 illustrates a scene rendered using hardware mip-mapped height map data. The most noticeable result of mip-map application to heights and normals may be incorrect calculation of optical effects, such as flattening water towards the horizon, which may lead to an unrealistically bright horizon, and incorrect shaping for calculated reflections such as sun glitter. Another drawback is increasing the visibility of the tiling. Area 251 of image 250 displays undesirable visual effects: the water appears to have a flat surface, reflections that should appear are lost, the sun reflection that does appear has an overly circular shape, and the detail of the waves drops off abruptly.

Image 260 illustrates a scene rendered using one technique to address limitations of mip-mapping: rendering the image using a negative level of detail (LOD) bias for sampling from the water textures. This may shift the problem area a bit further from the observer, but still results in similar shortcomings.

According to some aspects described further herein, the rendering of the visualization may be accomplished without the use of mip-mapped image data for height map values and may yield improved results without the quality step-offs associated with mip-maps. By contrast to images 250 and 260, images 270 and 280 illustrate scenes rendered using one or more aspects described herein without utilizing mip-maps for the height map data corresponding to the water surface. Image 270 illustrates a scene rendered without use of mip-maps for height map data, and image 280 illustrates a similar scene improved using 6× anti-aliasing to smooth out noise introduced by the detailed height map information at distance (which may be over-detailed given the distance from the viewer and small screen area occupied by representation of far away water). For example, area 281 retains visual characteristics of waves on the water surface and includes realistic reflections and sun glitter.

It may be advantageous when working without mip-maps in embodiments described herein to limit the size of wave's textures and/or compress them into a compact format to reduce cache misses. To accelerate texture sampling the GPU hardware may use several levels of caches (e.g., L1, L2, L3), which may each have different sizes, speeds and cache miss rates. When sampling a texture, the sampler may access the L1 cache and search for a desired sample or texel (pixels of texture) there, filter it, and rapidly return the corresponding result. If a sample or texel fragment is not in the cache, then a cache miss results and the GPU must spend time loading the desired texture data into the cache (from a slower level of cache and/or memory), according to some implementations. When not using mip-mapping, as described in some embodiments herein, problematic cache misses may occur near the horizon of the scene. At the horizon, the sampling step may be greater than the size of the cache L1 resulting in many more cache misses. In some embodiments, the system may utilize a smaller texture size and/or compact texture format allowing the texture to fit within the L1 cache, thereby eliminating cache misses.

As described above and further herein, one or more embodiments may synthesize waves on a water surface based on the combination of several height maps. The height maps may have different scales, which may simulate wave harmonics of different frequencies. This may result in a unique wave pattern (or signal) without noticeable repetitions due to the inclusion of both low-frequency and high-frequency harmonics. In solutions incorporating mip-maps, high frequency harmonics may be "smoothed out" by standard algorithms for mip-map generation. Graphics hardware may use lower levels (less resolution and more filtered) of generated mip-maps near the horizon. Due to this, there may be a "damping" of the contribution of a high-frequency component of the signal, and the rest (e.g., the low frequency component) may leads to visual tiling artifacts (e.g., a noticeably repeating pattern). However, according to one or more aspects described herein wherein scenes are rendered without use of mip-mapped height map data, the system may be able to utilize the original values of heights and normals associated with the simulated waves (as opposed to the "smoothed" version resulting from mip-mapping). This original data reflects the high-frequency components and may help to ensure the absence of visual tiling as well as provide visual correctness in the background.

By removing hardware mip-mapping for height and normal maps, techniques described herein may significantly reduce tiling and provide correct levels of sea roughness near the horizon and at distance from the observer. When mip-mapping is on, rendered visualizations may have reduced resolutions for textures near the horizon. Without mip-mapping, more texels of height and normal maps are available corresponding to a given pixel on the screen. In addition, this method may provide micro-level details, taking into account waves having a screen size of less than a pixel. One side effect of this may be an increased level of noise, which may result from undersampling due to a large sampling step relative to the signal frequency at locations near the horizon. One or more aspects described herein may utilize an improved subpixel antialiasing method to reduce the amount of noise present in visualizations rendered without height map mip-mapping. As will be described further herein, noise may be suppressed by an anti-aliasing algorithm that takes multiple samples of the original signal at a single pixel and averages the result of the calculation of optical phenomena in these samples.

Accordingly, one or more aspects described herein may provide an improved approximation of the true intersection between a ray cast through a given pixel and the water surface of the virtual world without use of mip-mapped height map data. The initial approximation generated by a projected grid (or any polygonal mesh approximating the wave contours, such as a tessellated mesh relative to the view point) may be iteratively improved using an approximation function, as described further below with reference to FIG. 3. The projected grid results may be used as initial conditions, and approximation errors may be corrected by a fast ray casting technique using an iterative approximation function. The iterative approximation function may, in some implementations, comprise additional features to improve convergence of the approximation function. This may reduce geometric aliasing effects where waves pop and shake when the viewpoint moves. One or more aspects described herein may improve dynamic stability of the approximation of the water surface.

Figure 3:
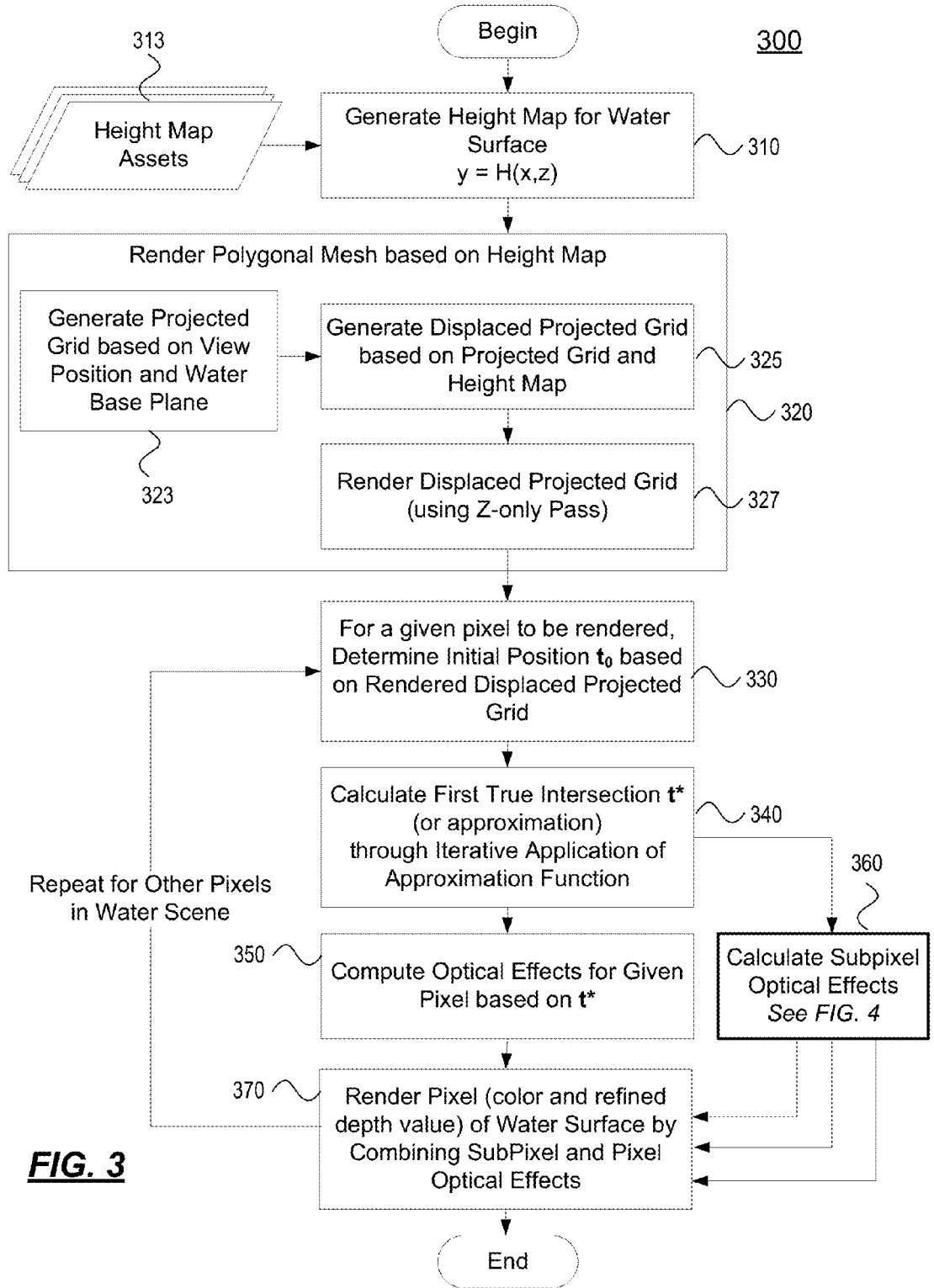
FIG. 3 depicts a flowchart illustrating steps of a method for generating a display of a fluid surface in a virtual environment according to one or more aspects discussed herein.

FIG. 3 depicts a flowchart that illustrates a method 300 of generating a display of a fluid surface in a virtual environment according to one or more aspects discussed herein. In one or more embodiments, the method illustrated in FIG. 3 and/or one or more steps thereof may be performed by a computing device (e.g., client device 103 of FIG. 1, server 105, etc.). In other embodiments, the method illustrated in FIG. 3 and/or one or more steps thereof may be embodied in computer-executable instructions that are stored in a computer-readable medium, such as a non-transitory computer-readable memory.

As seen in FIG. 3, the method may begin at step 310, in which a computing device may generate a height map for a water surface (or other fluid surface) in the virtual environment to simulate the presence of waves on the water surface. The height maps may be generated based on height map assets 313, such as through the superposition of multiple octaves of height maps.

Accurate visualization of the water surface defined by the height map may comprise identifying the first true intersection t* of a ray (or a good approximation thereof), drawn from the location of an observer and through a projected pixel of the observer's view, with the contours defined by the height map. t* may be a parameter of parametric equation indicating the location of the intersection between the ray and the water surface. Although t* is referred to herein as a "true intersection" of the ray, it should be understood that t* may represent a suitable approximation of the actual intersection determined according to aspects described herein. A suitable approximation of the first true intersection may be determined to be the value t* which provides convergence of an approximation function, as described further herein.

A ray passing from a view point through a given point on the water surface may be defined as:

$$\vec{R}(t) = \overline{ViewPoint} + \overline{ViewDirection} * t.$$

Where t is a ray parameter/coordinate. According to some aspects, a simplified intersection condition may be utilized comparing the y component of the ray with the height of the wave. The coordinates of first true intersection t* may be identified by solving the equation:

$$f(t) = R_y(t) - H(t) = 0$$

Where $R_y(t)$ is the vertical component (a projection of $\vec{R}$ onto the Y axis, such as shown in FIG. 2A) at position t of the ray drawn from the observer point through the pixel, and where H(t) is the result of sampling the height map function along the current ray, defined as:

$$H(t) = H(x(t), z(t))$$

$$x(t) = ViewPoint_x + ViewDirection_x * t,$$

$$z(t) = ViewPoint_z + ViewDirection_z * t,$$

The height function H(t) returns the height of the water surface at the x,z coordinates of position t within the virtual environment. H(t) may be a combined 2D height map resulting from wave synthesis as described above, and may incorporate additional factors such as wind, deformations, and the like. The respective heights (y values) may be defined relative to a base plane of the water surface. As described further herein, the computing device may identify the first true intersection t* (or a close approximation thereof) based on beginning with a rough approximation and iteratively refining that approximation. As described further herein, the rough approximation of a first intersection point ($t_0$) may be generated using a rendered polygonal mesh approximating the water surface.

At step 320, the computing device may render a polygonal mesh approximating the contours defined in the height map. The polygonal mesh may be used by the computing device to generate initial approximations for water surface positions corresponding to each displayed pixel in the water scene. One such type of polygonal mesh approximating the water surface is a projected grid as described above. At step 323, the computing device may generate the projected grid based on the observer's view position and a base plane of the water surface. At step 325, the vertices of the projected grid may be displaced based on the height map, thereby approximating the contours of the water surface. At step 327, the displaced projected grid may be rendered to generate the polygonal mesh approximating the water surface. In some implementations, steps 323 and 325 may correspond to steps performed by a vertex shader and step 327 may correspond to steps performed by a rasterization and pixel shader (where the water surface is rendered in one pass).

According to some aspects, and in some implementations, rendering the approximating mesh (for example, a projected grid) may be split into two passes to achieve higher polygon count than in single pass solutions (where rendering of mesh and color calculation are combined in a single draw call) while meeting similar performance rates/budgets. Single pass solutions may have large overhead for rendering small triangles due to over-shading. In a first pass, the computing device may render projected grid geometry into a depth buffer (or z-buffer). Color output may be switched off during this process, and an empty pixel shader may be utilized. Rendering into a z-buffer without color output may be 4-8 times faster, in some implementations, due to use of fast hardware depth-only rasterization features. Additionally, overshading penalties may be reduced during rendering the mesh of small triangles due to the pixel shader being off. And approximations and optical effects passes may run faster because of reduced overshading, requiring only a few larger polygons instead of many tiny triangles as in the single pass approach. As described further herein, in a second pass, which may be full-screen in scope, the computing device may read the z-buffer data from the first pass and calculate each pixel's color using the ray casting methods described further herein. The system may utilize the optical properties of the water surface at the true world positions (t*) corresponding to each pixel to determine color for each pixel in the full-screen geometry.

At step 330, the computing device may begin determining the visual content of each pixel in the water scene in a fullscreen pass. Steps 330-370 may be implemented as a pixel shader, according to some aspects. The computing device may determine, for a given pixel to be rendered, an initial position $t_0$ corresponding to an approximate world position of the given pixel. This initial position may be determined based on the rendered displaced projected grid (or other rendered polygonal mesh). The computing device may determine an initial position $t_0$ where a ray, drawn from the observer point through the given pixel, intersects the polygonal mesh (e.g. displaced projected grid). The initial position $t_0$ corresponding to the given pixel may be reconstructed from the depth render target of step 327, in some implementations. As the polygonal mesh is an approximation of the true water surface (as defined by the height map information), this initial position $t_0$ may provide a rough approximation of the world position on the water surface that corresponds to the given pixel. Thus, the rendered polygonal mesh may serve as an approximating mesh as described herein.

At step 340, the computing device may refine the initial position $t_0$ to identify the first true intersection t* (or close approximation thereof). The computing device may iteratively apply an approximation function starting with to and locate or better approximate t* after one or more iterations. f(t)=0 may be solved for using an approximation function based on Newton's method having the form:

$$t_n = t_{n-1} - \tau_n \frac{f(t_{n-1})}{f'(t_{n-1})} \to t^*$$

Where $t_n$ is the nth estimate of the first true intersection t*, beginning with $t_0$; where $\tau_n$ is a convergence parameter corresponding to the nth step of the approximation function $(0<\tau_n \le 1)$; where $f(t_{n-1})$ is the minimal distance from the water surface to a ray drawn from the observer point through the given pixel to point $t_{n-1}$ (as described above); and where $f'(t_{n-1})$ is the derivative of $f(t_{n-1})$. If the sequence converges, $t_n$ approaches t* and the method is able to locate the first true intersection t* (or close approximation thereof) and therefore the corresponding world position of the given pixel.

This approximation function is based on Newton's Method but makes use of convergence parameter $\tau_n (0<\tau_n \le 1)$, which may control a speed of convergence of the iterative function. Small values of $\tau_n$ may increase the probability that the method converges, but may increase the number of steps required. When $\tau_n$ has a value of 1 or close to 1, the method has quadratic convergence speed (a known property of Newton's Method [$\tau_n=1$] under some restrictions) but may be more dependent on a strong initial condition and derivative values to avoid diverging. Based on this, some embodiments may utilize a small $\tau_1$ for the first step to facilitate a high likelihood of convergence. This may address the shortcomings of the projected grid method which may provide inaccurate initial conditions and have a poor quality derivative. However, the accuracy of the approximation increases with each successive step and thus $\tau_n$ may be increased at each step such that $\tau_1 < \tau_2 < \ldots < \tau_n < 1$.

In some embodiments, the approximation function may incorporate additional aspects to control convergence towards t*. For example, increments in the approximation function may be clamped to a maximum change for each iteration. A clamp function sets a minimum and maximum value for a given function; if the parameter function exceeds the maximum value, the clamp returns the maximum, and if the parameter function is below the minimum value, the claim returns the minimum. This may address issues of low precision in f'(t). Thus, in some implementations the approximation function may be of the form:

$$t_n = t_{n-1} - \text{clamp}\left[\tau_n \frac{f(t_{n-1})}{f'(t_{n-1})}, -\text{max\_dt, max\_dt}\right]$$

Where max_dt is an empirical constant selected to prevent $t_n$ drastically veering from the initial approximation $t_0$. For example, a value of 0.05 may be utilized for max_dt with respect to pixel calculations.

As another example, the computing device may perform a check after each iteration of the approximation function to detect whether $t_n$ is converging to a point on the backside of a wave (relative to the observer). Such a result may be incorrect for the calculation of an accurate visualization of the wave. When the positions on the backside of a waves (which should normally be invisible to the observer) become visible, the result may have noticeable distortions or inaccuracies in visualization of the optical effects, which may be more noticeable than errors associated with an erroneous wave position on the front of a different wave (e.g., if the method converges to another intersection different from the first true). This wrong result (backside wave position) may be detected when the dot product of the view direction and the normal vector at $t_{n-1}$ is greater than 0, which would indicate that the normal vector is pointing away from the viewer (and is thus on the backside of the wave). If such a case is detected, the computing device may return the intersection point to the front side of the wave by setting:

$$t_n = t_{n-1} + \text{clamp}[C_b * \tau_n * f(t_{n-1}), -\text{max\_dt, max\_dt}]$$

Where $C_b$ is an empirical constant selected to adjust $t_n$ onto the front side of the wave. For example, a value of 250 may be utilized for $C_b$ in some embodiments.

In some embodiments, the computing device may iterate over the approximation function until $t_n$ converges to t*. The computing device may implement mathematical checks to determine when $t_n$ does not converge and may utilize a default value, such as $t_0$, or an alternative method in such a case. In other embodiments, the computing device may use a fixed number of iterations (such as 1 or 2 iterations, depending on target platform performance). Even with a fixed number of iterations, the use of a convergence parameter and/or the use of clamps may cause the approximation function to have a high likelihood to converge. For example, the clamp may ensure that the coordinates of the estimated intersection positions will be local to the initial approximation ($t_0$). If divergence points are detected, the computing device may minimize the visual impact of such results by reducing contrast between divergence values and other good (converged) values, which may reduce visibility of the divergence points, for example.

At step 350, the computing device may compute optical effects corresponding to the water surface at the first true intersection point t*. Realistic visualization of water may take into account a range of optical phenomena, including: reflections, refraction, light scattering, light absorption, water color, foam (above and/or under the water surface), shadows (surface and/or volume shadows), underwater views, separation of media, surf zone, and the like. The calculation of the various optical phenomena may be based on information from data sources such as reflection buffers, refraction buffers, main scene depth information, shadow maps, and the like. The calculations may be based on the characteristics of the water surface at point t*, and may further take into account the characteristics of the simulated water around point t*. A normal vector relative to the water surface at point t* may be utilized to provide information about the angle of incidence between the observer's line of sight and the surface of the water, according to some aspects.

Calculations of the optical effects, including reflected images and underwater images, may be calculated using the Fresnel equations to determine how reflective the water surface is at point t*. These equations describe how light behaves when crossing the boundary of two volumes having different refractive indices. The Fresnel equations may be used to determine a reflection coefficient R. This reflection coefficient may represent a proportion of light incident at point t* that is reflected versus transmitted through the water.

Fresnel coefficients may be approximated using Schlick's approximation:

$$R(t^*) = R_0 + (1 - R_0) * \left(1 + \max(dotProduct(\overline{Normal(t^*)}, \overline{ViewVector(t^*)}), 0)\right)^5$$

$$R_0 = \left(\frac{n_1 - n_2}{n_1 + n_2}\right)^2$$

Where $R(t^*)$ is reflection coefficient at point t* on the water surface, $n_1$ and $n_2$ are the indices of refraction of the two volumes, where $\overline{Normal(t^*)}$ is the normal vector from the water surface at point t*, and where $\overline{ViewVector(t^*)}$ is a ray from the observer point through point t*.

The reflection coefficients may be utilized to combine a determined reflection image and an underwater image to generate the visual characteristic for the given pixel. According to some aspects, the water color for a given pixel may be determined using the following equation:

WaterColor(t*)=ReflectionImage(t*)*R(t*)+Under-
    WaterImage(t*)*(1−R(t*))

Where R is the reflection coefficient determined at a point on the water surface corresponding to the given pixel, and each image corresponds to the calculated visual effect for the simulated optical phenomena at the point on the water surface. In some embodiments, reflection and refraction images of the scene may be rendered from special purpose cameras and may approximate optical effects using a flat water surface as a simplifying assumption.

For example, if point t* falls in the middle of a wave and has a relatively direct angle of incidence, the computing device may determine that there is low reflection and refraction is the main contributing factor at this particular point, and may visualize the water surface using a refracted under water image. As another example, if the angle of the water surface normal relative to the observer point was such that the water surface would be reflective at point t*, the computing device could determine what features should be reflected at that point (such as through the techniques described further herein with respect to FIG. 7) and set the visual characteristics of the pixel accordingly. If point t* is near the crest of a wave, the computing device may determine that the water is foamy or occluded, and may set the visual characteristics to resemble seafoam. The computing device may calculate one or more optical effects corresponding to the given pixel, and these optical effects may be used to determine the visual characteristics of the given pixel.

Calculation of shadow effects may take into account the particular characteristics of the water surface at point t*. According to some aspects, realistic shadow effects may be generated based on volumetric components of the simulated water beyond the water surface itself. The volumetric component may be utilized to estimate underwater light scattering effects. In some embodiments, the computing device may calculate the volumetric component for shadows through use of a shadow map and may use ray-casting techniques to calculate the shadow image. This process may be further optimized by upsampling the shadow map from a low-resolution buffer, and/or by employing jittering of rays, providing suitable quality while maintaining acceptable performance. Calculation of shadow effects is described further herein with respect to FIG. 9.

Calculation of deformation effects (such as explosions and water displacements) may be performed using special-purpose deformation particles. The deformation particles may employ heights and foam modifiers, and may be used to alter the contours and visual characteristics of the water surface. Use of deformation particles to modify the water surface may provide a high-performance approach to simulating deformations and provide increased resolution in determining optical effects associated with pixels having corresponding water surface positions that are impacted by the deformation, as compared to a global physics simulation method (covering all areas of activity in the virtual environment).

Continuing the discussion of FIG. 3, at step 360, the computing device may calculate similar optical effects for subpixels associated with the given pixel (and/or determine optical effects for the given pixel based on its constituent subpixels), and may apply a multisample anti-aliasing technique to generate realistic optical effects for a given pixel. Subpixels may correspond to logical portions of a pixel, and an arbitrary number of subpixel locations within the pixels of the scene may be utilized in calculating optical effects. Subpixels may correspond to render targets used in multisample anti-aliasing. In some embodiments, subpixels of other pixels may be referenced in calculating optical effects to be applied to a given pixel. For example, the computing device may sample a vertical range of subpixels adjacent to the given pixel, such as a range including one or more subpixels comprised in the given pixel but also including one or more subpixels comprised in adjacent pixels.

Through processing optical effects and visual characteristics at a subpixel level, the computing device may generate a sharper and more realistic visualization of the virtual environment. Subpixel processing may similarly utilize iteration over the approximation function described above to locate the first true intersection of each subpixel with the water surface. Using these intersections, the computing device may calculate optical effects at a more granular level and control the visual characteristics of the given pixel to better generate a realistic visualization of the water surface (e.g. at the subpixel level). Further, according to some aspects, multisampling anti-aliasing may be applied across the set of subpixels corresponding to a given pixel to generate accurate and realistic optical effects corresponding to the water surface. Subpixel processing and multisample anti-aliasing for optical effects will be described further below with respect to FIG. 4.

The computing device may return to step 330 (FIG. 3), and perform similar processing for each pixel in the water scene as part of the fullscreen pass. Alternatively, this processing could be performed in parallel with or in between the processing for the given pixel. Modern hardware is increasingly capable of performing parallel processing and some embodiments may calculate t* for multiple pixels simultaneously. The computing device may calculate a respective first true intersection t* for each pixel in the water scene, and may calculate corresponding optical effects for each pixel as part of generating a visualization of the water surface.

At step 370, the computing device may combine the optical effects for the given pixel, other pixels, and subpixels of the water scene and render the given pixel in a visualization of the water surface. The combination of optical effects may determine the visual characteristics of the pixel, including color and brightness. According to some aspects, the rendering of the visualization may be accomplished without the use of mip-mapped image data for height map values as described above, and may yield improved results without the quality step-offs associated with mip-maps. The rendered visualization may be output via a display incorporated in and/or communicatively coupled with the computing device, or may be stored in memory for later display.

Figure 4:
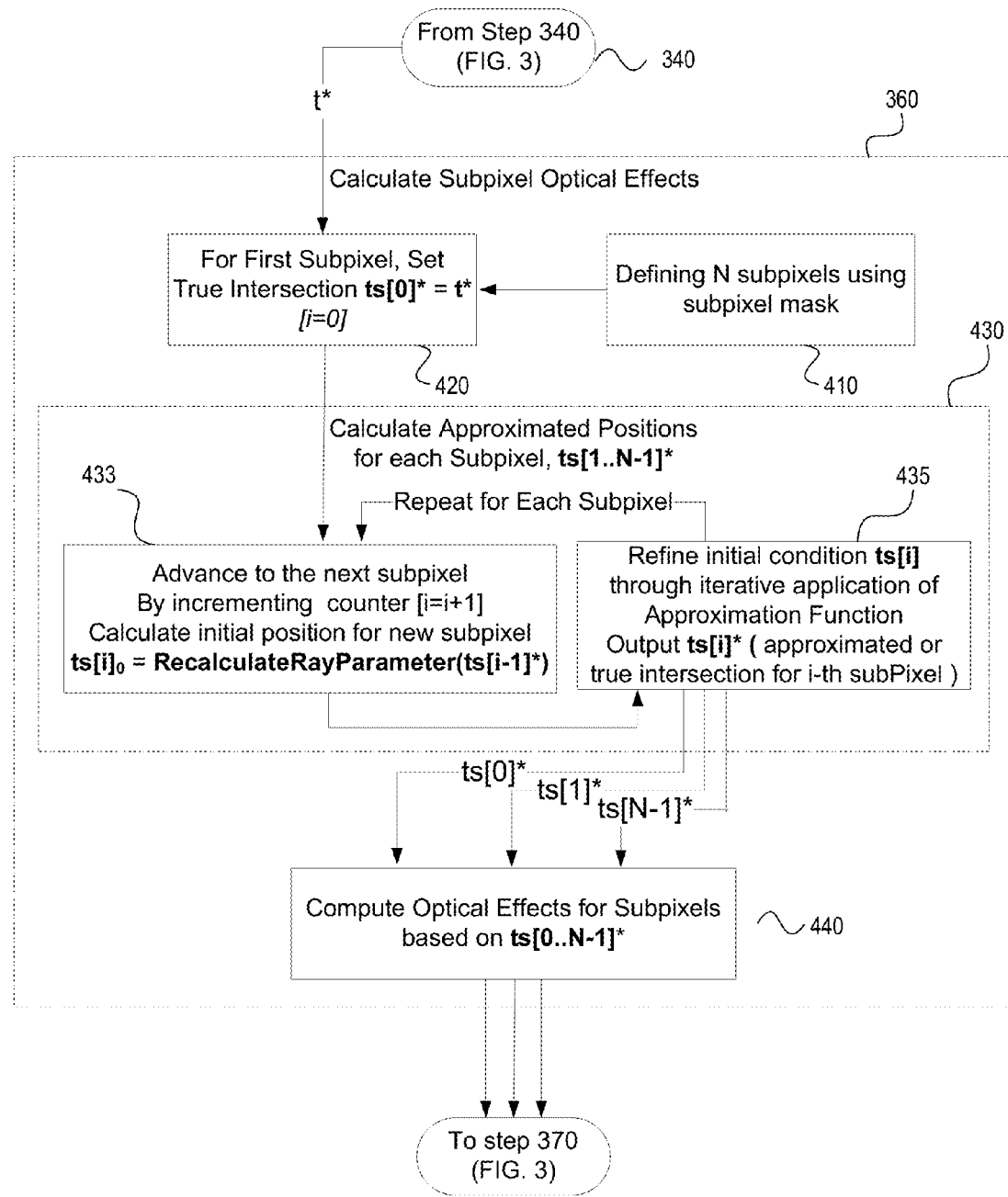
FIG. 4 depicts a flowchart illustrating further steps of a method for generating a display of a fluid surface in a virtual environment according to one or more aspects discussed herein.

Having discussed an illustrative method for generating and rendering a visualization of a water surface in a virtual environment, discussion will now turn to FIG. 4 in which an illustrative method of calculating optical effects associated with one or more subpixels is depicted.

FIG. 4 depicts a flowchart that illustrates details of subpixel processing that may, for example, be implemented as part of step 360 of FIG. 3 in some embodiments. The method illustrated in FIG. 4 may calculate subpixel optical effects for one or more subpixels associated with the given pixel, according to one or more aspects discussed herein. Through the method illustrated in FIG. 4, multisampling anti-aliasing of the subpixel optical effects may be used to generate more realistic visual characteristics of the given pixel. The computing device may sample the water surface conditions corresponding to the subpixels and calculate suitable optical effects for a given pixel. In one or more embodiments, the method illustrated in FIG. 4 and/or one or more steps thereof may be performed by a computing device (e.g., client device 103, server 105, etc.). In other embodiments, the method illustrated in FIG. 4 and/or one or more steps thereof may be embodied in computer-executable instructions that are stored in a computer-readable medium, such as a non-transitory computer-readable memory.

In the illustrated embodiment, the computing device may perform the method illustrated in FIG. 4 as part of the method illustrated in FIG. 3. After calculating the first true intersection t* (or close approximation thereof) for the given pixel in step 340, the computing device may proceed to calculate subpixel optical effects for a set of subpixels associated with the given pixel in step 360. Step 360 may include locating the first true intersection ts[i]* corresponding to each subpixel and performing a multisampling anti-aliasing analysis to determine one or more visual effects corresponding to the subpixels and/or given pixel based on the characteristics of the water surface corresponding to each subpixel.

At step 410, the computing device may determine a subpixel mask that defines N subpixels (variable ts[0 . . . N−1]) for sampling based on the given pixel. The subpixel mask may identify one or more subpixels logically located within the given pixel. Additionally and/or alternatively, the subpixel mask may identify one or more subpixels located in other pixels that may be sampled to determine suitable optical effects for the given pixel. In some embodiments, the subpixel mask may identify logical regions of the given pixel that correspond to one or more hardware subpixels associated with the pixel. Having determined which subpixels to include in the sampling group for the given pixel based on the subpixel mask in step 410, the computing device may begin locating the first true intersection ts[i]* (or close approximation thereof) for each of the N pixels in the sampling group. A subpixel of the N subpixels may be deemed a "main" sample (having index i=0), and may be used in optical calculations performed at the pixel (rather than subpixel) level.

Figure 5A:
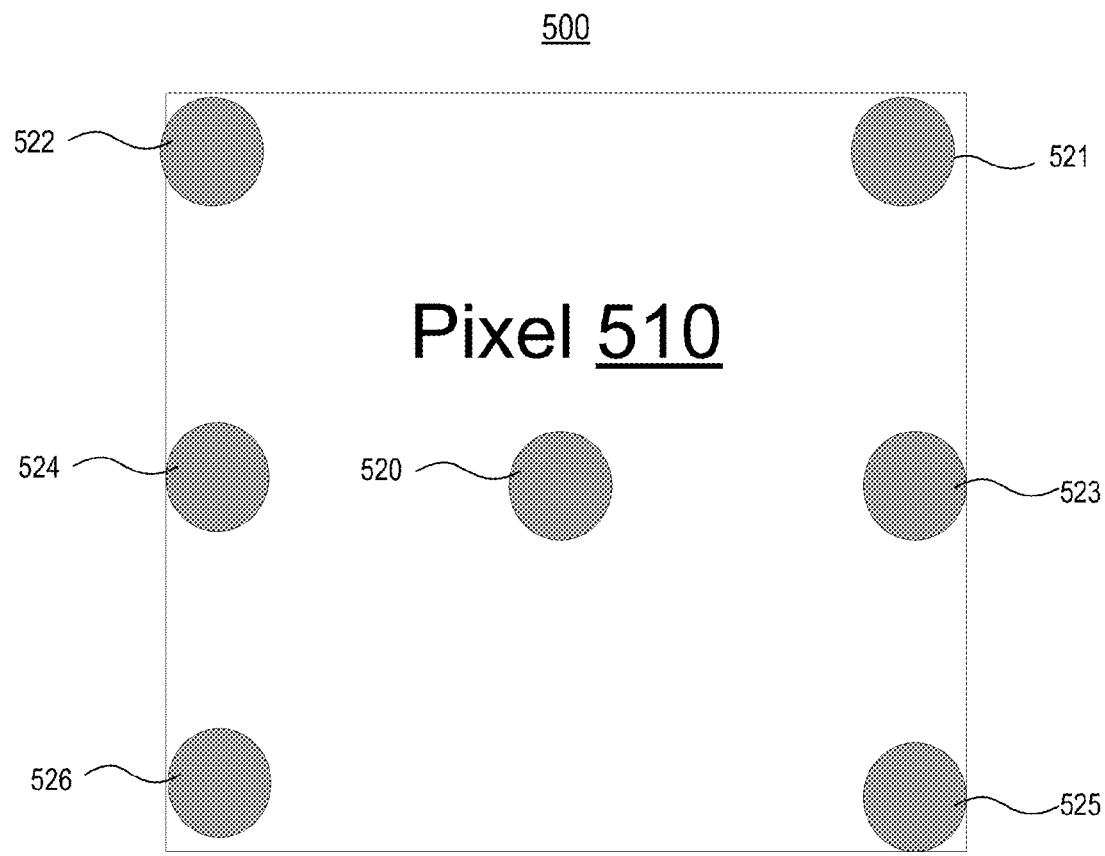
FIGS. 5A-5C depict an example of a subpixel mask and associated techniques that may be utilized according to one or more aspects discussed herein.
Figure 5B:
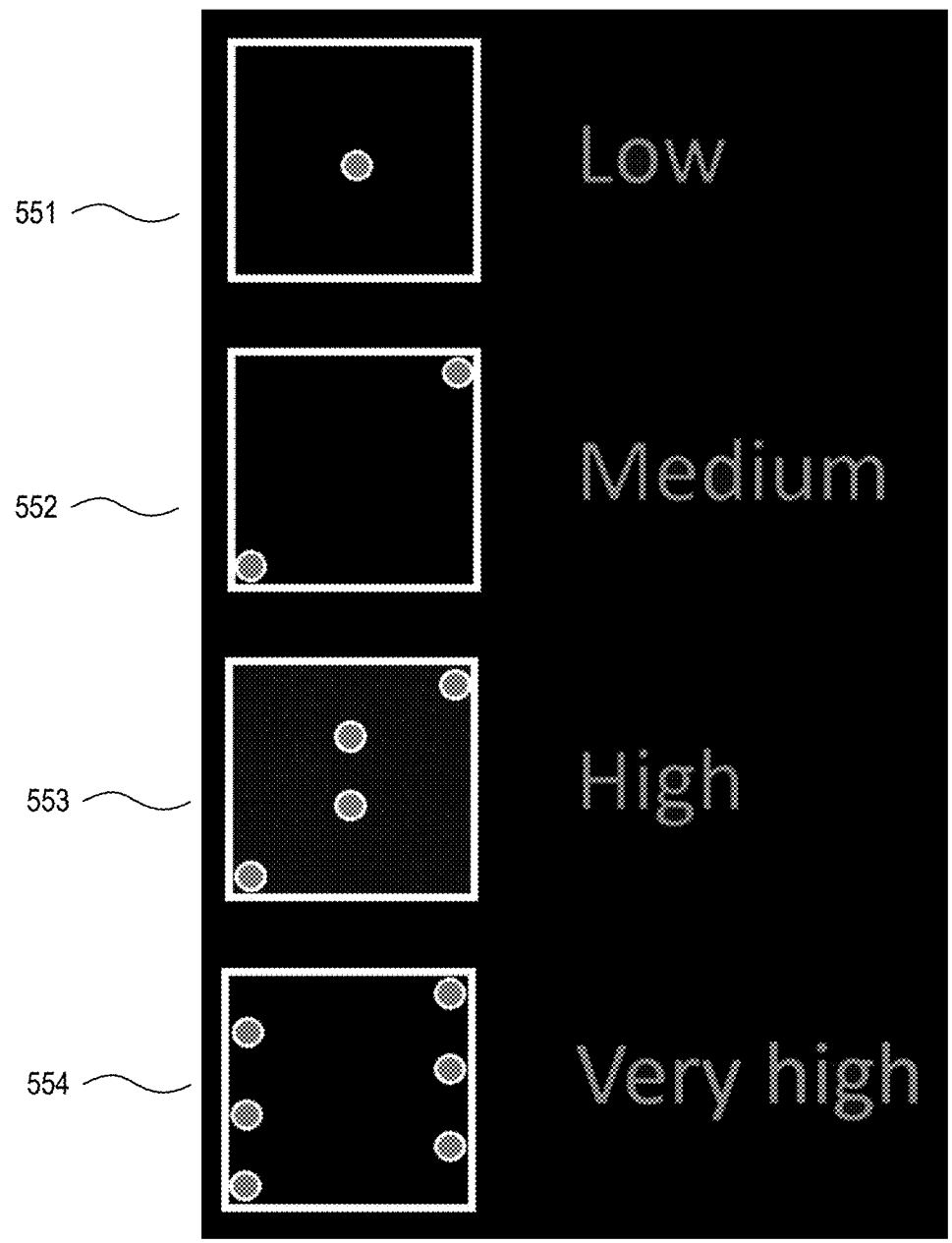

A sample subpixel mask 500 for pixel 510 is illustrated in FIG. 5A. In the illustrated example, seven subpixels (520, 521, 522, 523, 524, 525, and 526) are included in the mask 500. Mask 500 is only one example, and any suitable subpixel mask may be used to identify subpixels that may be sampled to determine suitable optical effects for the given pixel. The mask may be defined and applied relative to the given pixel, in some embodiments, such as where the mask includes subpixels of other pixels. In some implementations, the mask may indicate more subpixel samples in a vertical direction than in a horizontal direction. In some implementations, (for example, when the pixels are output to a MSAA render target) the mask may correspond to the physical position of subpixels/samples. In some implementations, efficiency may be increased by varying the amount of samples and their positions. For example, FIG. 5B illustrates various examples of different subpixel masks that may be utilized to achieve varying levels of detail based on performance considerations. For example, mask 551 omits subpixel processing generally through use of a single subpixel corresponding to the pixel itself. Mask 552 provides a medium level of detail by using another subpixel in addition to the main sample. Masks 553 and 554 provide higher levels of detail through the additional of further subpixels. Moreover, additional increases in efficiency may be obtained if the amount of samples and their distributions are determined adaptively according to estimation of approximation error in a current pixel or its subpixels.

Figure 5C:
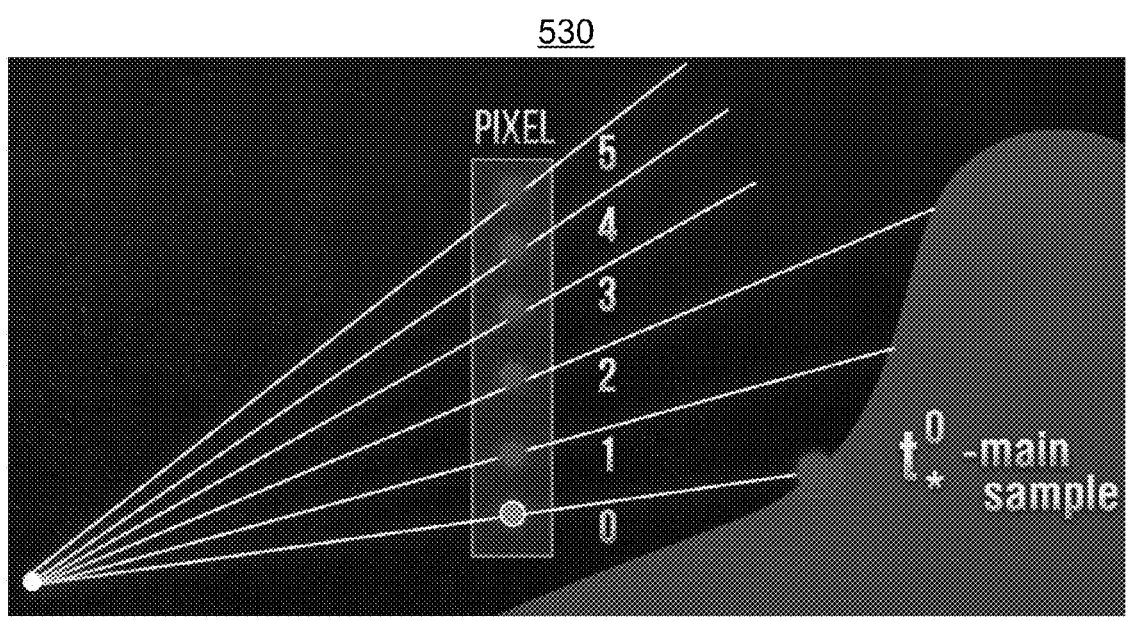

Calculation of subpixel optical effects may comprise identifying the first true intersections ts[0 . . . N−1]* of rays (or a good approximation thereof), drawn from the location of an observer and through the respective subpixel, with the contours defined by the height map. An example of this is provided in FIG. 5C, which shows a diagram 530 illustrating rays cast through an example mask having N=6 subpixels.

ts[i]* may be a root of a parametric equation indicating the location of the intersection between the $i^{th}$ ray and the water surface. Because ts[0], in some implementations, corresponds to the location of the pixel itself, ts[0]* may be previously calculated as part of calculating t* in FIG. 3. Similarly to the method described above with respect to FIG. 3 and as described further herein, the computing device may identify the first true intersections ts[1 . . . N–1]* (or a close approximation thereof) for each other subpixel based on beginning with a rough approximation and iteratively refining that approximation. In some embodiments, approximation quality may be improved by sorting samples so that a distance between adjacent samples is minimized when they are traversed during the calculation of subpixel positions/optical effects.

At step 420, the computing device may set the true intersection for the first subpixel, ts[0]*, to the true intersection t* calculated for the given pixel. This first subpixel (i=0) may correspond to the position used to calculate t* for the pixel in step 340, and thus the first true intersection is already known. In other embodiments (not shown), the system may instead use t* as an initial approximation for ts[0]* and may apply an iterative approximation function to determine ts[0]*. Due to proximity between the subpixels and the given pixel, the true intersection t* for the given pixel may serve as a good initial approximation for the true intersection ts[0]* in the case of a mask where the first subpixel does not correspond to the position used in pixel calculations.

At step 430, the computing device may calculate the true intersections for each other subpixel, ts[i]*, where i ranges from 1 to N–1. Step 430 may comprise substeps 433 and 435. Having determined the first true intersection ts[0]* (or close approximation thereof) of the first subpixel (i=0), the computing device may proceed to calculate the true intersection ts[i]* for each other subpixel corresponding to the given pixel. At step 433, the computing device may increment i to advance to the next subpixel, up to a maximum value of N–1. The computing device may set an initial position ts[i]$_0$ based on the data calculated as the first true intersection of the previous subpixel, ts[i–1]*, as follows:

$$ts[i]_0 = \text{RecalculateRayParameter}(ts[i-1]^*)$$

Figure 12:
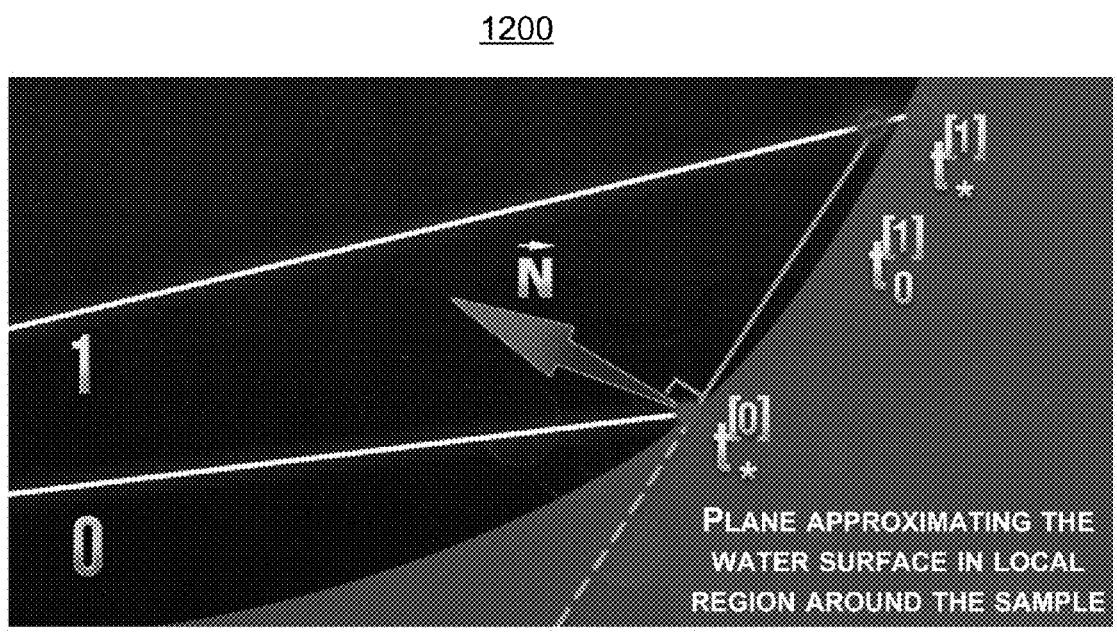
FIG. 12 depicts an example of spatial computations according to one or more aspects described herein.

This function (RecalculateRayParameter) may calculate an initial value (approximation) ts[i]$_0$ of the ray parameter for a current subpixel by determining the intersection of a ray $\vec{R}_i$ (t) cast through the current $i^{th}$ subpixel with a plane defined by the first true intersection point ts[i–1]* of the previous subpixel and the normal vector $\overrightarrow{Normal}_{ts[i-1]^*}$ at that point (ts[i–1]*). Expressed mathematically, the computing device may determine the intersection between:

$$\vec{R}_i(t) = \overrightarrow{ViewPoint} + t^* \overrightarrow{ViewDir}_i, \text{ and}$$

$$\text{Plane}(\vec{R}_{i-1}(ts[i-1]^*), \overrightarrow{Normal}_{ts[i-1]^*})$$

Where $\vec{R}_i$ (t) is a ray cast through subpixel i, that intersects the plane based on the previous subpixel at point t=ts[i]$_0$, that corresponds to the position $\vec{R}_i$ (ts[i]$_0$) in the world space, and ViewDir$_i$ is a view vector passing through the current subpixel. Note that the index i–1 means that the parameters belong to the previous subpixel. FIG. 12 provides a diagram 1200 illustrating the spatial constructs used in RecalculateRayParameter, where t[0]* and a plane defined by the normal vector at t[0]* are used to identify an initial position t[1]$_0$ for subpixel i=1. An example of the final formula with an additional clamp is:

$$ts[i]_0 = \text{clamp}\left[\frac{dotProduct(\overrightarrow{ViewDir}_{i-1}, \overrightarrow{Normal}_{ts[i-1]^*})}{dotProduct(\overrightarrow{ViewDir}_i, \overrightarrow{Normal}_{ts[i-1]^*})}, 0.9, 1.05\right] * ts[i-1]^*$$

In some embodiments (not shown), when the system has processed more than one subpixel/sample, the quality of prediction for further subpixels/samples may be improved by building and intersecting more complex surfaces based on the data from these samples:

$$ts[i]_0 = \text{RecalculateRayParameter}_i(ts[i-1]^*, ts[i-2]^*, \ldots ts[i-k]^*),$$

$$0 \leq i-k < N$$

In some embodiments (not shown), the initial position ts[i]$_0$ for one or more subpixels may be calculated based on determining a ray parameter associated with the current subpixel where a ray drawn through the current sample would intersect the water surface and/or the rendered projected grid, rather than utilizing the results of prior subpixels.

Having determined an initial position ts[i]$_0$ for the current subpixel, processing may proceed to step 435. In step 435, the computing device may calculate the first true intersection ts[i]* for the current subpixel. Similarly to the method described above with respect to step 340 of FIG. 3, the first true intersection ts[i]* may be located by finding the solution of f(ts[i]*)=0 beginning with initial position ts[i]$_0$ and iteratively refining the approximation using an approximation function of the form:

$$ts[i]_n = ts[i]_{n-1} - \tau_n \frac{f(ts[i]_{n-1})}{f'(ts[i]_{n-1})} \to ts[i]^*$$

Where ts[i]$_n$ is the $n^{th}$ estimate of the true intersection ts[i]*, beginning with ts[i]$_0$; where $\tau_n$ is a convergence parameter corresponding to the nth step of the approximation function (0<$\tau_n$≤1); where f(ts[i]$_{n-1}$) is the minimal distance from the water surface to a ray drawn from the observer point through the given subpixel to point ts[i]$_{n-1}$; and where f'(ts[i]$_{n-1}$) is the derivative of f( ). If the sequence converges, ts[i]$_n$ approaches ts[i]* and the method is able to locate the true intersection ts[i]* and therefore the corresponding world position of the $i^{th}$ subpixel.

As described above with respect to step 340 of FIG. 3, the approximation function may utilize a convergence parameter, $\tau_n$(0<$\tau_n$≤1) to facilitate convergence of the function. Some embodiments may similarly incorporate a clamp function and/or checks to determine if the approximation function converges to the backside of a wave. For example, the approximation function may utilize a clamp feature as follows:

$$ts[i]_n = ts[i]_{n-1} - \text{clamp}\left[\tau_n \frac{f(ts[i]_{n-1})}{f'(ts[i]_{n-1})}, -\text{max\_dt}, \text{max\_dt}\right] \to ts[i]^*$$

As one example, subpixel processing may utilize a value of 0.33 be used for max_dt.

As described above with respect to pixel processing, in some embodiments the computing device may iterate over the approximation function until ts[i]$_n$ converges to ts[i]*, while in other embodiments the computing device may utilize a fixed number of iterations. Even with a fixed number of iterations, the use of a convergence parameter and/or the use of clamps may cause the approximation function to have a high likelihood to converge. For example, the clamp may ensure that the coordinates of the estimated intersection positions will be local to the initial approximation (ts[i]$_0$). If divergence points are detected, the computing device may minimize the visual impact of such results by reducing contrast between divergence values and other good (converged) values, which may reduce visibility of the divergence points, for example.

Processing may return to step 433 to calculate the true position ts[i]* for the next subpixel, incrementing i and processing each subpixel. The initial position ts[i]$_0$ for the next subpixel may be used to generate the true position for that subpixel ts[i]* using the same method described above. This process (steps 433 and 435) may repeat until all subpixels have been processed and each value of ts[0 . . . N−1]* has been determined by the computing device.

At step 440, the computing device may compute optical effects for the subpixels based on the calculated first true intersections ts[0 . . . N−1]*. The optical effects may correspond to the water surface at each point ts[0 . . . N−1]*. As with step 350 of FIG. 3 above, the optical effects may include: reflections, refraction, caustic, light scattering, light absorption, foam (above and/or under the water surface), shadows (surface and/or volume shadows), and the like.

Optical effects for the set of sampled subpixels may be combined to generate a combined effect for the given pixel, yielding a result based on multisampling anti-aliasing. The computing device may compute a first set of optical effects based on the given pixel, and may compute a second set of optical effects based on the corresponding subpixel sampling group. The first and second sets of optical effects may comprise different types of optical effects. In some implementations, the second set of optical effects (computed based on the subpixels) may be a subset of the first set of optical effects (computed based on the given pixel), or vice versa. For example, an optical effect such as reflections may be calculated at both the pixel and subpixel level, and the effects may be combined to generate a more accurate visualization.

The computing device may be configured to compute rapidly changing optical parameters (or the parameters on which they depend for their rapid change) for the sampled subpixel, such as normal vectors, reflections, Fresnel coefficients, and the like. As these optical parameters may vary across the sampled space, calculating them on a subpixel level and summing their values into pixel color through the multisampling anti-aliasing techniques described herein may reduce alias artifacts in the water surface visualization. As noted above, the computing device may calculate some optical effects on a subpixel level while calculating other effects on a per-pixel level. For example, the computing device may calculate reflections for each subpixel corresponding to the given pixel, but may calculate the underwater image on the basis of the given pixel. In this example, the computing device may utilize the calculated underwater image for the given pixel in processing to determine the visual characteristics and optical effects for the corresponding subpixels.

According to some aspects, SubPixelColor may be calculated as a combination of subpixel optical effects (which may be fast-changing optical values, such as reflections, Fresnel coefficients) and per-pixel optical effects (which may be rarely-changing optical values, such as underwater images, refraction, shadows). Color for a given subpixel may be determined as a combination of subpixel optical effects and per-pixel optical effects as follows:

SubPixelColor(i)=Combine(SubPixelOpticals(ts[i]*), PerPixelOpticals(t*))

Where Combine adds up the colors associated with the various optical effects based on weights assigned to each, ts[i]* is the calculated true intersection (or approximation thereof) of a ray through the i$^{th}$ subpixel with the water surface, where R(ts[i]*) is the Fresnel coefficient at point ts[i]*, and where t* is the calculated true intersection of a ray through the given pixel with the water surface. For example, where reflections are handled on a subpixel basis and underwater images are handled on a per-pixel basis, the color for a given subpixel may be calculated as follows:

SubPixelColor(i)=ReflectionImg(ts[i]*)*R(ts[i]*)+ UnderWaterImg(t*)*(1−R(ts[i]*))

At step 370, the computing device may combine optical effects calculated for the given pixel and the corresponding subpixels, and may render a visualization of the water surface. Each sampled subpixel optical effect may be assigned a sample weight (or importance) based on an error estimation formula. If the normal vector at a given subpixel's intersection point indicates it is near and/or on the backside of a wave, for example based on an angle between $\overrightarrow{ViewDir_i}$ and $\overrightarrow{Normal_{ts[i]*}}$, the subpixel may be assigned a low weight to reduce the impact of optical effects on wave edges or the backside of a wave. The sampled values for each subpixel may be combined based on the assigned weights, and may be further combined with the computed optical effects for the given pixel. The combined value may be used to determine the visual characteristics of the given pixel. Use of multisampling anti-aliasing based on subpixel optical effects may reduce the occurrence of undesirable aliasing artifacts which would otherwise result from the limitations of generating a defined resolution scene of a virtual environment.

The subpixel optical effects may be combined with the optical effects generally calculated for the given pixel in step 350 of FIG. 3.

According to some aspects, calculation of optical effects may be improved by calculating some optical effects at a per-pixel level while others are calculated at a per-subpixel level. Values that do not change as rapidly, such as underwater images, may be calculated on a per-pixel basis while values that do change rapidly, such as reflection coefficients and normal vectors, may be calculated on a per-subpixel basis, in some implementations. This may provide flexibility in implementation, allowing developers to balance quality with calculation costs.

Subpixel optical effects may be combined to produce final color for the given pixel according to weights assigned to each subpixel, which may be based on an estimate of how suitable the height map is at the intersection point corresponding to the respective subpixel. For example, the following function could be used in some implementations to calculate visual characteristics of a given pixel:

$$PixelColor = \frac{\sum_{i=0}^{N-1} SubPixelColor(i) * SubPixelWeight(i)}{\sum_{i=0}^{N-1} SubPixelWeight(i)}$$

Where SubPixelColor(i) is the color for a given subpixel, as described above, and where SubPixelWeight(i) is the weighting for a given subpixel as described above.

The combination of the improved approximation function and the optical effects calculated in adjusted (corrected) points even on per-pixel level may improve the geometric stability of the water surface and improve optical at a distance and may be suitable for low-end systems. The geometry and optical effects quality may be further improved as described above with shader-based multisampling anti-aliasing which may reduce aliasing artifacts at subpixel levels for high-end GPUs. Shader-based multisampling anti-aliasing may be further adapted into hardware multisampling antialiasing solutions for high-end GPUs. These techniques may considerably decrease image flickering and the visibility of bright artifacts on the crests of waves and in deformation areas.

Figure 6:
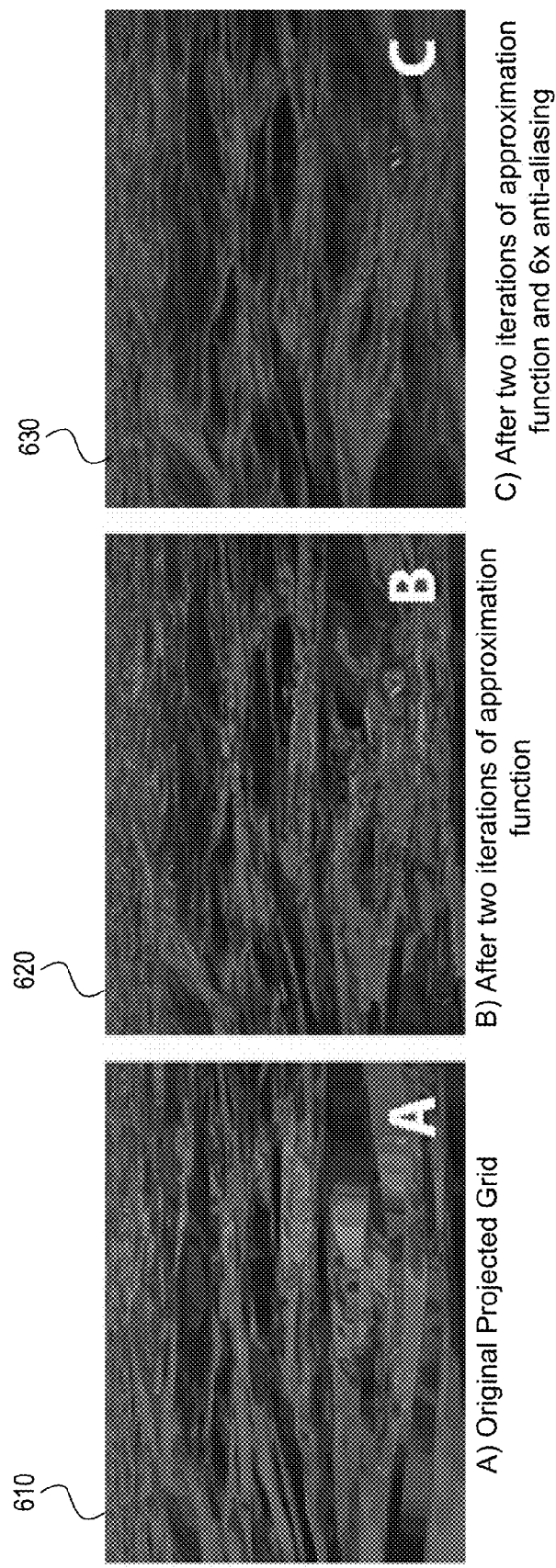
FIG. 6 depicts illustrative scenes rendered according to one or more aspects discussed herein.

FIG. 6 depicts illustrative displays of water environments rendered according to one or more aspects described herein. Image 610 illustrates a first rendered environment based on the original projected grid technique. Image 610 includes noisy colors, and rough geometry leads to stretched textures. Image 620 illustrates a second rendered environment where the initial approximation of the projected grid technique was improved through two steps of the approximation function as described above with respect to FIG. 3, and may provide a good balance of performance and detail on low-end systems. Image 630 illustrates a third rendered environment where the initial approximation of the projected grid technique was improved through two steps of the approximation function as described above with respect to FIG. 3 and a six-sample anti-aliasing process as described above with respect to FIG. 4, and may provide a good balance on high-end GPUs. One of ordinary skill in the art may readily appreciate that the scenes depicted in images 620 and 630 provide a more realistic water scene than that illustrated in image 610.

Figure 7:
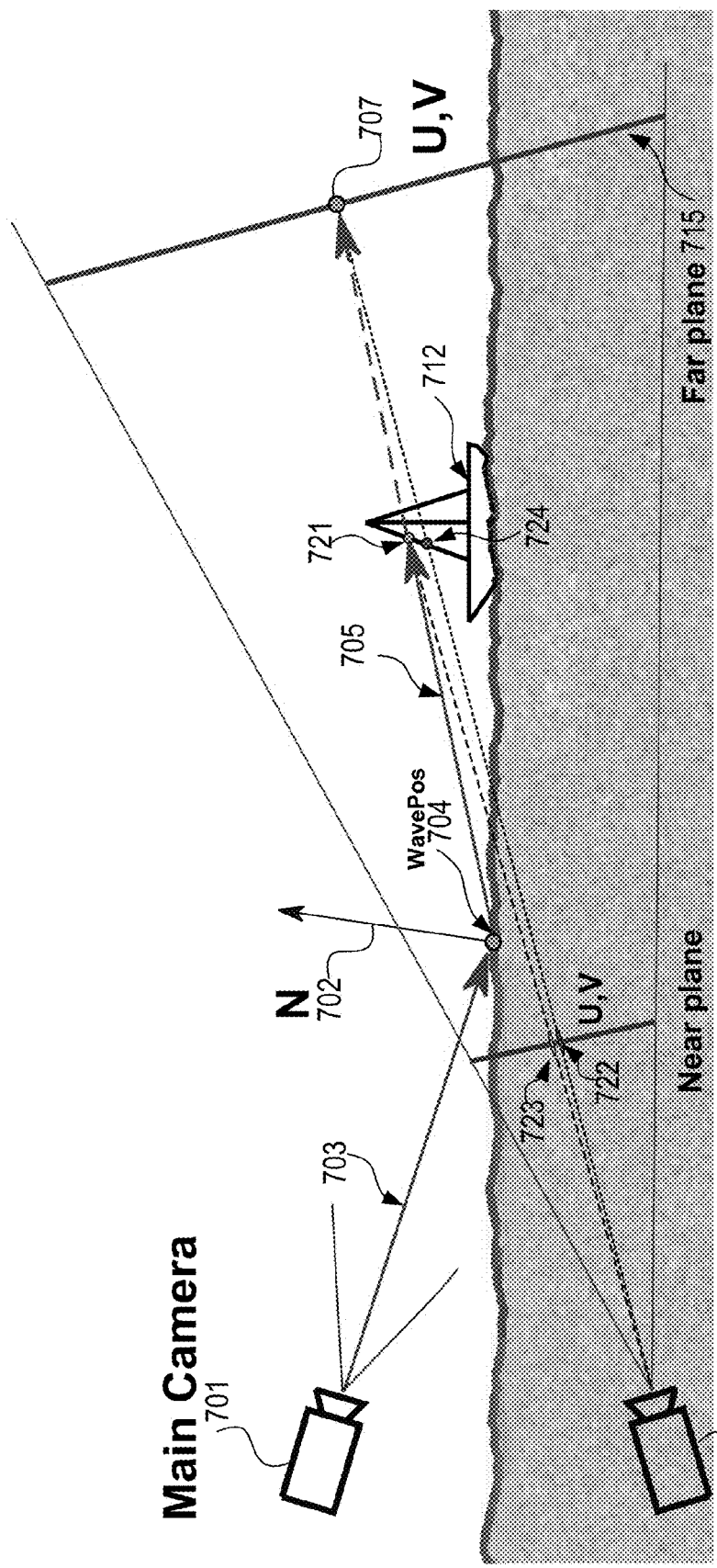
FIG. 7 depicts an illustrative representative of an arrangement for calculating reflections according to one or more aspects discussed herein.

Having described a method of generating improved visualization of a water surface in a virtual environment as illustrated in FIGS. 3 and 4, discussion will now turn to an improved method of calculating reflections on the water surface with reference to FIG. 7.

As described above, visualization of a virtual environment may comprise the projection of rays from a camera location 701 towards surfaces in the virtual environment. For example, a given pixel may correspond to ray 703 and the computing device may determine visual characteristics for the given pixel based on where ray 703 intersects the water surface (at point 704, the wave position corresponding to the pixel). Optical characteristics of the given pixel may be based on the normal vector 702 of that point 704 relative to the water surface. The correct value of the reflected color can be obtained at the point of intersection (721) of a reflected ray (705) with an object (712), but such an approach may be unsuitable for real-time applications. Most existing real-time methods simulate reflections of objects on the water surface, such as object 712, using a separate reflection camera 711 located under the water surface. The reflection camera is used to render an approximate reflection scene. This reflection scene may be combined with the other optical effects for the given pixel (and other pixels) to approximate the reflected image. One example of such as method is described by Claes Johanson in "Real-time Water Rendering: Introducing the Projected Grid Concept," [Lund University, 2004], discussed supra. Such methods may create a rippling distortion effect on a rendered mirrored scene that is dependent on the normal vector 702 relative to the water surface. The rippling is multiplied by a user-defined parameter to control the strength of the distortion. As this is not a physically correct approximation, the user-defined parameter in existing methods must be adjusted by a designer until the effects appear suitable. Other methods include the Realtime Local Reflection (RLR) method described in Tiago Sousa, et al., "Secrets of CryENGINE 3 Graphics Technology", Siggraph 2011). In that paper, they use ray-marching to generate reflections. Ray-marching has the disadvantage of being expensive in terms of GPU time, and may only be suitable for higher-end graphics hardware. Moreover, expenses associated with ray-marching reflection techniques may significantly increase when an attempt is made to apply such techniques at a subpixel level.

According to some aspects, a new method of calculating reflections may be provided. The computing device may use a reflection ray 705 from the point 704 of the water surface corresponding to the given pixel. The angle of reflection ray 705 may be a reflection of ray 703 over the normal vector at the corresponding point on the water surface. The computing device may use the intersection point 707 where the reflection ray 705 intersects with the far clip plane 715 of the reflection camera 711 to determine the content of the reflection image. For example, the computing device may use an intersection point of reflection ray 705 with the far-plane 715 of reflection camera 711 to determine (u, v)-coordinates on a reflection texture rendered from reflection camera 711. Such an improvement may yield more realistic results, especially for heavy swells on the sea, than the 2D texture rippling distortion method discussed above. This improvement may also provide benefits in content creation because it does not require special user-defined parameters to control the strength of distortions.

In particular, reflection ray 705 may be calculated as follows below. First, the system may calculate the direction of the reflection ray (ray 705):

$$\vec{ReflectDir} = \vec{ViewDir} - 2 * \vec{Normal} * dot(\vec{ViewDir}, \vec{Normal}),$$

$$\vec{ViewDir} = normalize(\vec{WavePos} - \vec{ViewPoint})$$

Where ViewDir is the normalized view vector (corresponding to ray 703) from the main camera 701 through the water surface at point 704, and Normal is the normalized water surface normal 702 at the point 704 of intersection of ray 703 and the water surface. The reflection ray 705 may be calculated as follows:

$$\vec{R}(t) = \vec{WavePos} + t * \vec{ReflectDir}$$

Where WavePos is the point 704 where the current camera view ray 703 intersects the water surface, and where t is a ray parameter.

Texture coordinates for the reflection image may be identified based on the intersection of reflection ray 705 with the far clip plane 715 of the reflection camera 711. This calculation may be simplified using post projection space of the reflection camera, simplifying the far plane equation to z=w. The reflection ray R may be converted into post projection space to ray RP as follows:

$$\vec{RP}(t) = reflectionMVP \times \begin{bmatrix} WavePos.x + t * ReflectDir.x \\ WavePos.y + t * ReflectDir.y \\ WavePos.z + t * ReflectDir.z \\ 1.0 \end{bmatrix}$$

Where reflectionMVP represents the Model-View Projection (MVP) 4×4 matrix of the reflection camera 711. For optimization purpose, the formula may be split into the vector sum:

$$\vec{RP} = \vec{Pos0} + t * \vec{dPos}, \text{ where}$$

$$\vec{Pos0} = reflectionMVP \times \begin{bmatrix} WavePos.x \\ WavePos.y \\ WavePos.z \\ 1.0 \end{bmatrix}$$

– ray origin in post projection space, $$\vec{dPos} = reflectionMVP \times \begin{bmatrix} ReflectDir.x \\ ReflectDir.y \\ ReflectDir.z \\ 1.0 \end{bmatrix}$$

– ray direction in post projection space

With this simplification, the reflection ray 705 intersects the far plane 715 when its coordinates satisfy:

$$z = \Rightarrow Pos0.z + t_{refl} * dPos.z = Pos0.w + t_{refl} * dPos.w \Rightarrow$$

$$\Rightarrow t_{refl} = \frac{Pos0.z - Pos0.w}{dPos.w - dPos.z}$$

$$\Rightarrow \vec{FarP} = \vec{Pos0} + t_{refl} * \vec{dPos}$$

Where $t_{refl}$ is the value of ray parameter at intersection point 707, and where FarP is the post projection (clip space) coordinates of intersection point 707 of the reflection ray 705 and the far plane 715.

The system may calculate texture coordinates on the reflection texture. The system may further transform the intersection point from post projection (clip) space to standard normalized device coordinates (NDC):

$$\frac{farP.x}{farP.w}, \frac{farP.y}{farP.w} \text{ in range } [-1 \ldots 1, -1 \ldots 1]$$

The normalized coordinates may be mapped into texture space:

$$\begin{bmatrix} u \\ v \end{bmatrix} = \begin{bmatrix} \frac{1}{2} * \frac{farP.x}{farP.w} + \frac{1}{2} \\ \frac{1}{2} * \frac{farP.y}{farP.w} + \frac{1}{2} + reflectionShiftUp \end{bmatrix}$$

Where $$\begin{bmatrix} u \\ v \end{bmatrix}$$

are components of a texture coordinate corresponding to intersection point 707 in the range [0 . . . 1, 0 . . . 1], and wherein reflectionShiftUp is a constant having a value reflectionShiftUp=1/(the height of the reflection image in pixels). The system may read the color from the reflection texture at coordinates (u,v), which may be expressed as:

reflectionColor=ReadReflectionImage(u,v)

where reflectionColor may be a 3 component RGB color vector.

FIG. 7 depicts point 721 on object 712, which corresponds to an accurate position for use in calculation of optical phenomena. The reflection of point 721 would be the most accurate data to use in determining the color of water in the current pixel. However, calculating coordinates of 721 may be computationally expensive, requiring determination of the exact intersection of the ray 705 with object 712. Aspects described herein may offer a fast way to approximate the reflection of point 721 described above. Also illustrated in FIG. 7 is point 724 on object 712. Point 724 may be a result according to the methods described in this section. Despite the fact that these points (points 721 and 724) lie on slightly different parts of the yacht sail in the illustrated example, the visual error may be small. The visual error depends on the distance in the screen space. Point 723 in the screen space corresponds to the accurately calculated point 721, while point 722 corresponds to the point 707 (and point 724) constructed for fast reflection approximation (according to aspects described herein). The screen space distance between points 723 and 722 shows the magnitude of the error of the illustrative approximation relative to the true reflection point. Use of this approximation may yield acceptable results because, when visualizing large open scenes in a virtual environment, such errors may be insignificant.

Figure 8:
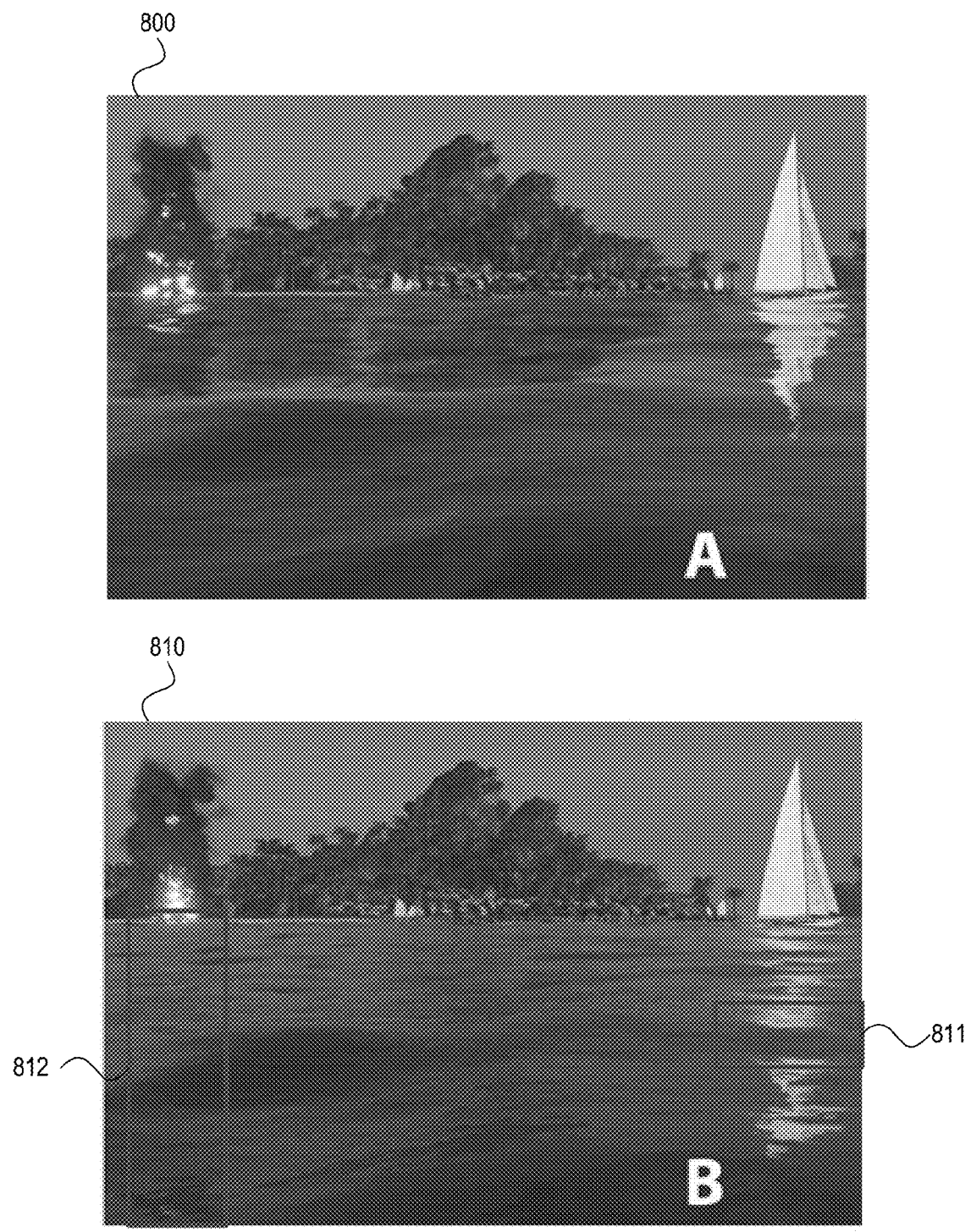
FIG. 8 depicts a comparison of a scene rendered using existing methods with a scene rendered according to one or more aspects discussed herein.

FIG. 8 depicts illustrative displays of reflections in water environments rendered according to one or more aspects described herein. Image 800 illustrates reflections generated using the rippling distortion effect based on normal vectors described by Claes Johanson in "Real-time Water Rendering: Introducing the Projected Grid Concept," [Lund University, 2004]. Image 810 illustrates rippling reflections generated using a special reflection camera, according to aspects described above. Feature 811 illustrates the optical effect on a large wave. In image 800, the sailboat is reflected on the surface of the large wave facing the observer even though this is incorrect. In image 810, the sailboat is properly not reflected on the surface of the large wave 811. Additionally, feature 812 illustrates more realistic reflections of light from a light source, such as the fire on the shore. In image 800, the fire is simply mirrored and distorted. In image 812, the fire is properly reflected as a vertically stretched shape across the water surface. One of ordinary skill in the art may readily appreciate that the reflections illustrated in image 810 provide a more realistic visualization than the reflections illustrated in image 800.

One or more aspects described herein may increase realism in water surface visualizations through computing an additional volumetric component for use in shadow calculations. Conventional solutions may calculate shadows only at the water surface level. Aspects described herein may utilize a volumetric component which simulates the effects of underwater light scattering on small dirt particles (as are present in real water). This volumetric component may be calculated using specialized ray-casting techniques on a shadow map. Good balance between quality and performance may be obtained through rendering shadows in a low-resolution buffer (such as ¼ to ½ of the screen size, in some embodiments). Additionally, jitter techniques may be used to adjust cast rays and reduce banding artifacts. These features will be described below with reference to FIGS. 9A and B, 10A and B, and 11.

Figure 9A:
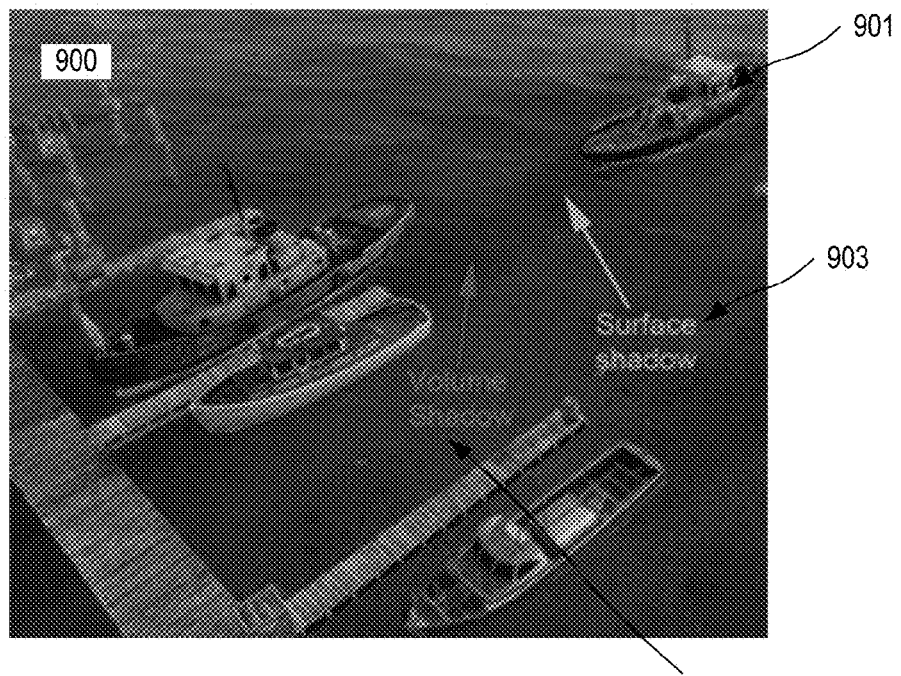
FIGS. 9A and 9B depict illustrative scenes for describing shadow calculations according to one or more aspects discussed herein.

FIG. 9A illustrates an illustrative scene 900 rendered to simulate both surface and volumetric shadows, providing a more realistic visualization of the water surface. In scene 900, an object 901 (a boat in the harbor) casts a shadow onto the water (surface shadow component 903) and also casts a shadow into the depths of the water (volume shadow component 905) based on a directed light source for the scene (e.g., the sun). The surface shadow component 903 may be used to adjust (and/or be adjusted based on) sun glitter, foam, reflections, and other surface visual components. The volume shadow component 905 may be used to adjust (and/or be adjusted based on) underwater colors, seabed characteristics, and other underwater visual components. These two shadow components may be used simultaneously to generate a more realistic shadow visualization, according to aspects described herein. The surface shadow component 903 may be calculated using conventional means, such as percentage-closer filtering (PCF) and/or Rotated Poisson Disk. The volume shadow component may be calculated using the specialized ray casting methods described with reference to FIGS. 10A, 10B, and 11, below.

Figure 9B:
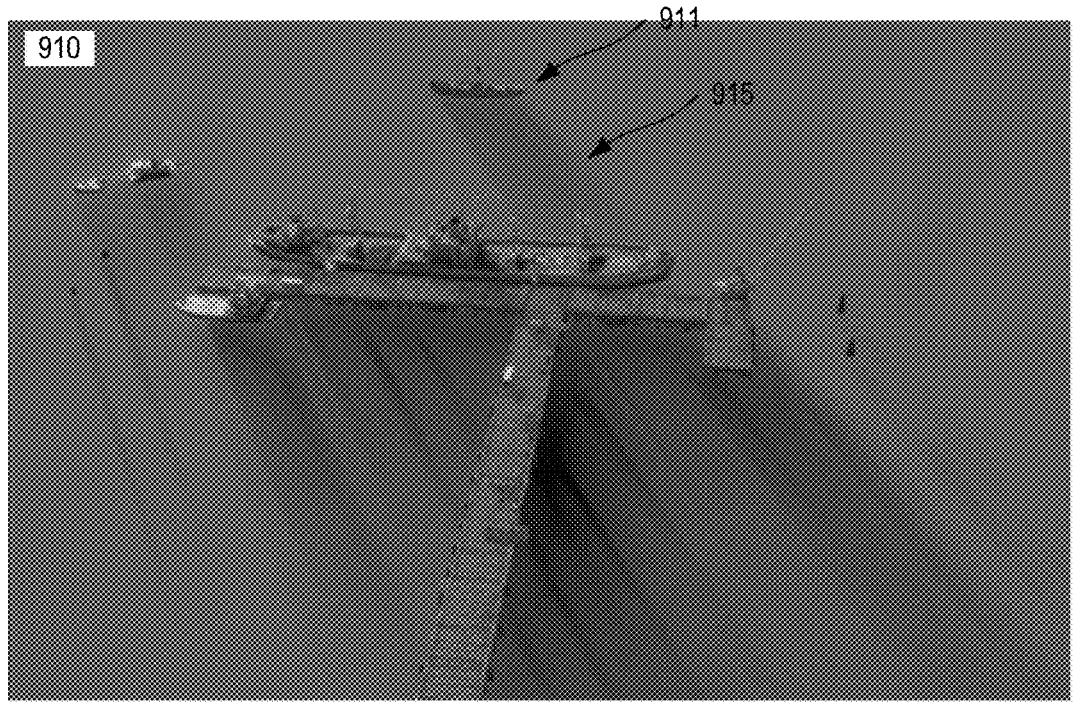

FIG. 9B illustrates an image 910 showing example volumetric shadow component 915 calculated for object 911 (a boat in a harbor).

Figure 10A:
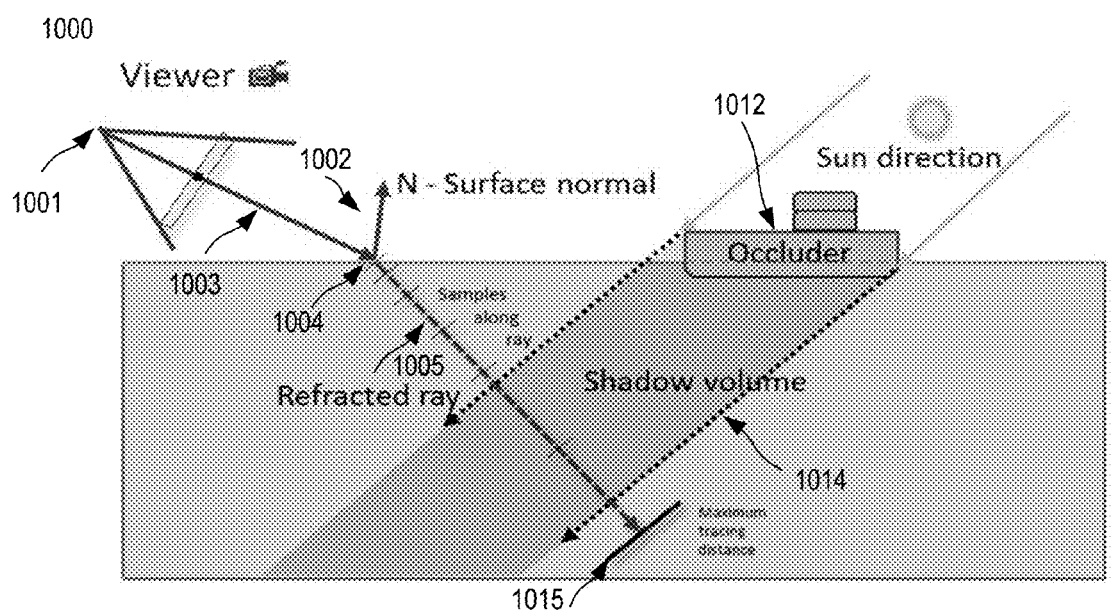

FIG. 10A diagrammatically illustrates an environment 1000 in which a volume shadow component of the shadow (1014) attributable to an occluder object 1012 (such as a boat) may be calculated. For each visible water pixel (e.g., an on-screen pixel covered by water) in the scene, as seen by viewer 1001, the system may calculate a shadow effect corresponding to a volume shadow component. A view ray 1003 from the view point 1001 to the water surface intersects the water surface at point 1004. The system may calculate the normal vector 1002 at the point 1004. Based on the view ray 1003 and the normal vector 1002, the system may calculate a refraction vector $\overrightarrow{RefractDir}$ 1005 using the characteristics of the water. $\overrightarrow{RefractDir}$ may be calculated using basic optical equations (such as those described above) based on the view ray 1003, the normal vector 1002, and the refractive index of the water surface (1.33 for water). The refraction vector may be used to generate the refracted ray 1005 as:

$$\vec{R} = \overrightarrow{WavePos} + \overrightarrow{RefractDir} * t$$

Where $\vec{R}$ is parametrized formula of the refracted ray 1005, $\overrightarrow{WavePos}$ is the origin of the refracted ray (e.g. point 1004), $\overrightarrow{RefractDir}$ is a normalized direction of the refracted ray, and t is the ray parameter. At t=0, the refracted ray 1005 starts from the water surface, and with increasing value of t the refracted ray 1005 either intersects a solid object or is deemed scattered due to the depth traveled (such as at maximum tracing distance 1015), according to some embodiments.

The system may then calculate samples distributed along refracted ray 1005, utilizing a jittering offset and/or a random angle associated with a Poisson disc (described further below). The samples may be taken at random offsets along the refraction ray. The system may be configured to assess a number of volume samples in calculating the volume shadow component. A shadow map associated with the position of the sample may be used to obtain a visual effect associated with that sample (e.g. a shadow intensity and/or color). The shadow effect associated with a sample may be attenuated (e.g. reduced) based on a distance along the refraction ray and a distance between samples. The attenuated volume shadow effects associated with each sample may be summed and the sum may be used to calculate an aggregate volume shadow effect based on one or more parameters allowing designers control over the intensity and attenuation of volume shadow effects. One implementation according to some aspects is illustrated in FIG. 10B.

FIG. 10B illustrates exemplary pseudocode for calculating a volume shadow component for visible water pixels, according to one embodiment. As illustrated in line 1050, the system may proceed to calculate shadow components for each visible water pixels.

In line 1051, the system may calculate parameters of the refraction ray (origin—at the wavePos, and its direction=refracted ray direction) as described above with respect to FIG. 10A. In line 1052, the system may calculate additional casting parameters such as a number of steps, and maximum casting distance—the distance where the refracted ray either intersects a solid object or is deemed scattered due to the depth traveled. At line 1053, the system may set an initial volume shadow sum to a value of 0.

At line 1054, the system may begin to loop over a defined number of volume samples. Parameter VolumeSamples may be set by designers based on a desired quality level. In some embodiments, VolumeSamples may be set to a value of 11 for very high quality volume shadow calculations. For each sample k, the system may perform the calculations listed in lines 1055-1060.

At line 1055, the system may set ray parameter t to a jittered position along the ray. JitteredRayPos(PixelPos,k) may return a ray parameter with a logarithmic distribution along the ray, having a random offset based on the pixel position. In one exemplary implementation, JitteredRayPos (PixelPos, k) may be defined as:

$$JitteredRayPos(PixelPos,k) = (k^2 + NoiseTexture(pixelPos) * stepScale) * factor^2$$

Where PixelPos is 2D coordinates associated with the current pixel, k is the current sample, NoiseTexture is a function that returns a pseudo random value from 0 to 1 for the current pixel (which may utilize a tiled 2D texture having random values), factor is defined as 1/(volumeSamples−1), and stepScale is defined as 2*k.

At line 1056, the system may calculate an attenuation value w associated with the sample, which may correspond to how the contribution of the shadow for that sample decreases with distance due to dispersion effects. Attenuation value w may be calculated based on a function AttenuationOfShadow(t), which may be defined as:

$$AttenuationOfShadow(t) = e^{-t * volAttenuation}$$

Where volAttenuation is a parameter allowing designers to control attenuation effects of volume shadows. In some implementations, volAttenuation may have a range of 0.0 to 5.0, and may have a default value of 0.3. Because the distance between consecutive samples is not uniform in some embodiments, attenuation of the shadow may be adjusted based on a distance between consecutive samples.

The system may utilize shadow maps to determine shadow intensities associated with a given sample. Shadow intensities may range for 0 to 1, in one embodiment. A value of 0 may indicate full cover by shadows, while 1 may indicate no shadow at the location. According to one embodiment, the system may utilize the Parallel Split Shadow Maps approach described in Zhang, F, "Parallel-Split Shadow Maps on Programmable GPUs," GPU Gems 3, Chapter 10 (2007), the entirety of which is incorporated herein by reference. Prior to the water rendering pass, the system may render and place all shadow splits (in one embodiment, maxSplitCount may be set to 3 or 4), in one texture (for example, organized left to right from nearest to farthest). This single texture may include depth information of the scene rendered based on the corresponding split cameras.

Using this exemplary split shadow map embodiment, at line 1057, the system may calculate a sample position corresponding to a world position for the sample along the refracted ray based on a shadow map transformation matrix-shadowSplitMVP [indexOfBestSplit] associated with a particular light source (e.g. the sun) and best suitable split. The sample position may be a 3 dimension vector (where x and y components used as 2 dimensional texture coordinate for addressing content in the shadow map and z is depth of the current object in shadow space). The sample may be determined using a function ShadowMapTransform(worldPos (t)). The system may determine the index of a best split of the shadow textures based on which split provides the most accurate shadow resolution corresponding to a given worldPos. Then, the ShadowMapTransform(worldPos(t)) function may be defined as follows:

$$\overrightarrow{splitPos} = shadowSplitMVP[indexOfBestSplit] \times \begin{bmatrix} worldPos.x \\ worldPos.y \\ worldPos.z \\ 1.0 \end{bmatrix}$$

$$ShadowMapTransform(worldPos(t)) = \begin{bmatrix} \left(\frac{1}{2} * splitPos.x / splitPos.w + \frac{1}{2} + indexOfBestSplit\right) \Big/ \\ maxSplitCount - \\ \frac{1}{2} * splitPos.y / splitPos.w + \frac{1}{2} \\ splitPos.z / splitPos.w \end{bmatrix}$$

Where shadowSplitMVP[i] is a model view projection matrix of a frustum corresponding to split camera i, where worldPos is a world position associated with the sample, where indexOfBestSplit is the index of the split camera providing the most accurate shadow resolution for the worldPos, and where maxSplitCount is a count of the number of split cameras used in the shadow map implementation.

At line 1058, the system may calculate a random offset to adjust the sample position. This may have the effect of limiting undesirable banding effects in the rendered shadows. The random offset may be calculated based on randomly rotating Poisson disk samples, using a function RotatedPoissonDisc(k, PixelPos) which may be defined as:

$$RotatedPoissonDisc(k, PixelPos) = \\ mul(poissonDiskSamplesTable[k], rotMat(PixelPos))$$

$$rotMat = \begin{bmatrix} noise.x & -noise.y \\ noise.y & noise.x \end{bmatrix}$$

noise = *textureWithSinCosOfRandomAngle(PixelPos)*;

Where rotMat is a matrix used for rotating 2D samples on random angles, and where the noise is calculated by reading from a 2 dimensional texture filled by (sin( ),cos( )) pairs of a random angles, and where poissonDiskSamplesTable[ ] contains 2 dimensional coordinates of samples distributed on a Poisson disk. Rotated Poisson disks are described further in Isidoro, J, "Shadow Mapping: GPU-based Tips and Techniques," Game Developers Conference 2006, the entirety of which is incorporated herein by reference. Stratified Poisson sampling is described in opengl-tutorial, "Tutorial 16," available at http://www.opengl-tutorial.org/intermediate-tutorials/tutorial-16-shadow-mapping/(2016), the entirety of which is incorporated herein by reference.

The random offset also may be used to simulate a realistic blur effect of the shadows. A radius of the blur may have a minimum value on the water surface, and then increase as the distance from the water surface increases. The blur increment may define how blurring of the shadows increases with the distance from the water surface. This value may be set by a designer, and may have a default value of 3 in one implementation. The blur radius also may be adjusted based on a size of a shadow map texture.

At line 1059, the system may evaluate the value of the shadow map based on the sample position and the random offset. The system may compare a depth value stored in the shadow map at samplePos (x,y) with a depth of a current fragment samplePos (z) to find the intensity of the shadow. In one implementation, the system may utilize hardware PCF (percentage-closer filtering) to improve the quality of the comparison. The system may compare, for example, 4 neighboring texels of the shadow map with a given depth value and return a result of bilinear filtering between the compared values. This value may be attenuated by the attenuation value and may be added to a running sum for the volume shadow effect. At line 1060, the attenuation value may be added to a running weight sum for the volume shadow effect.

At line 1061, after calculating the volumeShadowSum and sumWeight over each sample along the refracted ray, the system may compute an aggregate volume shadow component. The volume shadow component may be determined based on the volume shadow sum adjusted by the sum weight, and may be adjusted further based on a volume shadow intensity value. The volume shadow intensity value may be a parameter set by designers ranging from 0 to 1, with 0 representing no volume shadow effects and 1 representing full volume shadow effects, with partial effects in between. At line 1062 the system may complete processing for each visible water pixel.

Figure 11:
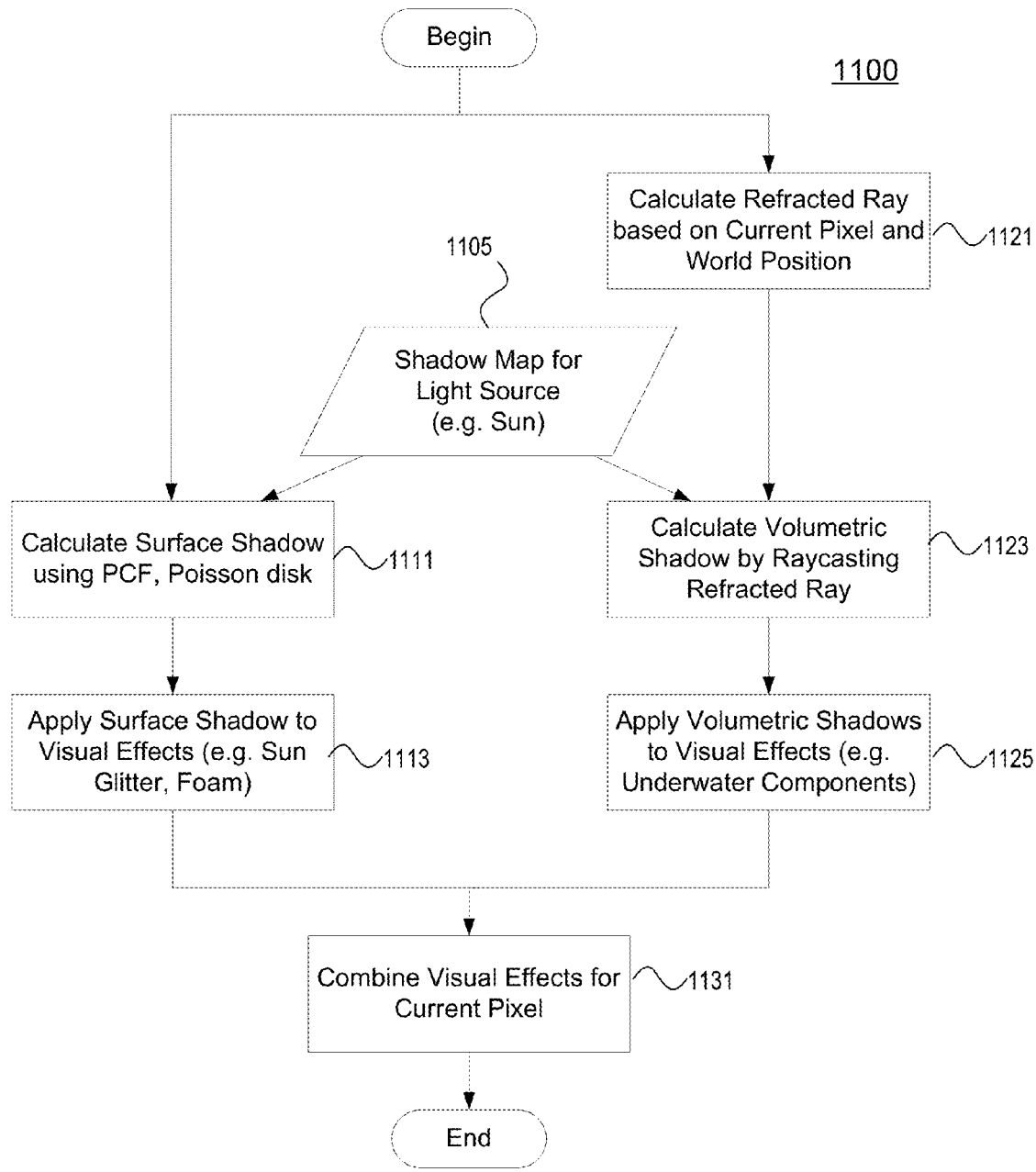
FIG. 11 depicts a flowchart illustrating steps of a method for calculating shadow effects according to one or more aspects described herein.

FIG. 11 illustrates an exemplary method 1100 for calculating the surface shadow components and the volumetric shadow components for the current point on the water surface according to one or more aspects described herein. The method may separately calculate the surface shadow component and the volumetric shadow component. In practice, the method 1100 may be repeated for every pixel covered by water.

At step 1105, the system may calculate and/or retrieve shadow map information for a given directed light source. For example, the system may generate and/or retrieve a shadow map associated with the sun in a given scene.

At step 1111, the system may calculate a surface shadow component using conventional PCF and/or Poisson disk methods.

At step 1113, the system may apply the surface shadow to attenuate (e.g. reduce) certain surface visual effects, such as sun glitter and surface foam.

At step 1121, the system may calculate a refracted ray based on the current position on the water surface associated with the current pixel. As described above, the refracted ray may be calculated using basic optical laws based on refracting a view vector at the current water position about a normal vector using an index of refraction associated with water (e.g. 1.33).

At step 1123, the system may calculate the volumetric shadow component by raycasting along the refracted ray, as described above with respect to FIG. 10B.

At step 1125, the system may apply the calculated volumetric shadow component to certain underwater visual effects, such as the underwater image color.

At step 1131, the calculated volume shadow for a given pixel/subpixel of the display may be utilized in computing a pixel/subpixel color. Specifically, the combine function for combining the calculated color and visual effects for a given subpixel (as described further above) may be defined as:

SubPixelColor($i$)=ReflectionImg($ts[i]^*$)*$R(ts[i]^*$)+
UnderWaterImg($t^*$)*$(1-R(ts[i]^*$)), where R($ts[i]^*$) is Fresnel coefficient described above. This function may be enhanced to take into account the surface shadow component and the volume shadow component described above, with the following substitution:

ReflectionImg→ReflectionOfEnvironment+
sunGlitter*surfaceShadow
UnderWaterImg→UnderWaterImg*volumeShadow Surface foam effects may be similarly adjusted using the surface shadow component.

Some implementations may incorporate hardware multi-sample anti-aliasing in addition to or as an alternative to software implementations of aspects described herein. For example, if any of the multisample locations (subpixels) in a pixel is covered by a triangle being rendered, a shading computation may be performed for that triangle. However, in some implementations this calculation only needs to be performed once for the whole pixel regardless of how many sample positions are covered. Thus, the result of the shading calculation may be applied to all of the relevant multi sample locations, without recalculating the shading computation. Hardware multisampling anti-aliasing may involve the creation of a special image buffer to store intermediate values of color/depth samples. The buffer size may proportionaly increase with the number of samples.

Obtaining an anti-aliased image may, in some implementations, be performed by a Resolve( ) procedure. Resolve( ) may average the information from the multisample anti-aliasing buffer. According to aspects described herein, implementations may provide anti-aliasing without an increase in the amount of memory needed regardless of the number of subpixels being sampled. The Resolve( ) procedure may perform the averaging across samples and may incrementally use data from neighboring samples. This may have the effect of significantly increasing calculation speed and may allow for the sampling optical components with higher or variable frequency, leading to improved realism in visualization of water surfaces.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims are included in the scope of the present disclosure. For example, the steps illustrated in the illustrative figures may be performed in other than the recited order, and one or more steps illustrated may be optional in accordance with aspects of the disclosure.

What is claimed is:

1. A method for generating a display of a fluid surface in a virtual environment, the method comprising:

rendering, by the computing device, a displaced mesh approximating the fluid surface from a perspective of a view point, wherein the displaced mesh is generated based on height map data defining contours associated with the fluid surface;

determining, by the computing device and for a first pixel of the display, an initial ray parameter $t_0$ based on an intersection of a first ray cast from the view point through the first pixel with the rendered displaced mesh;

determining a refined intersection point of the fluid surface and the first ray by iteratively refining the initial ray parameter $t_0$ to generate an approximated ray parameter $t^*$ using an approximation function of the form $$t_n = t_{n-1} = \tau_n \frac{f(t_{n-1})}{f'(t_{n-1})} \to t^*,$$

wherein:

$f(t_{n-1})$ is a function that returns the difference of the height of a point on the first ray at position $t_{n-1}$ and the height of the fluid surface as defined by the height map data at position $t_{n-1}$;

$t_n$ is the nth approximation of the intersection of the first ray and the fluid surface;

$t^*$ is a refined approximation of a first true intersection of the first ray with the fluid surface determined based on convergence of the approximation function; and $\tau_n$ is a convergence parameter corresponding to the nth step of the approximation function, $0 < \tau_n \leq 1$;

computing one or more optical effects for the first pixel based on the contours of the fluid surface and the approximated ray parameter $t^*$; and rendering, by the computing device, the display of the fluid surface based on the computed one or more optical effects for the first pixel.

2. The method of claim 1, further comprising generating the displaced mesh by:
projecting a uniform grid onto a base plane of the water surface from the view point, thereby generating a projected mesh; and
displacing vertices of the projected mesh based on the height map data, thereby generating the displaced mesh.

3. The method of claim 1, wherein the displaced mesh is a tessellated mesh relative to the view point.

4. The method of claim 1, wherein the height map data does not utilize mip-mapped image data.

5. The method of claim 1, wherein rendering the display of the fluid surface further comprises performing shader-based anti-aliasing based on averaging optical parameters of a plurality of samples from a plurality of components of the height map data.

6. The method of claim 1, further comprising:
determining approximated subpixel ray parameters for each of a plurality of subpixels associated with the first pixel, wherein determining the corresponding approximated subpixel ray parameters for a first subpixel of the plurality of subpixels is based on further application of the approximation function to the approximated ray parameter t*; and
computing one or more optical effects for each subpixel based on the contours of the fluid surface and the corresponding approximated subpixel ray parameters, wherein rendering the display of the fluid surface is further based on the computed one or more optical effects for the plurality of subpixels.

7. The method of claim 6, wherein determining the approximated subpixel ray parameters for each of the plurality of subpixels other that the first subpixel is based on a prior approximated subpixel ray parameter corresponding to a prior subpixel of the plurality of subpixels.

8. The method of claim 1, wherein the approximation function is clamped at each step and of the form $$t_n = t_{n-1} - \text{clamp}\left[\tau_n \frac{f(t_{n-1})}{f'(t_{n-1})}, -\text{max\_dt}, \text{max\_dt}\right],$$

wherein max_dt is a maximum permitted change per iteration of the approximation function.

9. The method of claim 1, wherein the value of $\tau_n$ increases for higher values of n such that $\tau_1 < \tau_2 < \ldots < \tau_n \leq 1$.

10. The method of claim 1, wherein the iteratively refining the initial ray parameter $t_0$ to generate the approximated ray parameter t* further comprises:
detecting an error condition when a dot product of a view direction and a normal vector of the fluid surface at position $t_{n-1}$ is greater than 0; and
in response to detecting the error condition, setting $t_n = C_b f(t_{n-1})$, wherein $C_b$ is a constant.

11. A system comprising:
one or more processors; and
memory storing instructions that, when executed by the one or more processors, cause the system to:
render a displaced mesh approximating the fluid surface from a perspective of a view point, wherein the displaced mesh is generated based on height map data defining contours associated with the fluid surface;
determine, for a first pixel of the display, an initial ray parameter $t_0$ based on an intersection of a first ray cast from the view point through the first pixel with the rendered displaced mesh;
determine a refined intersection point of the fluid surface and the first ray by iteratively refining the initial ray parameter $t_0$ to generate an approximated ray parameter t* using an approximation function of the form $$t_n = t_{n-1} - \tau_n \frac{f(t_{n-1})}{f'(t_{n-1})} \to t^*,$$

wherein:
$f(t_{n-1})$ is a function that returns the difference of the height of a point on the first ray at position $t_{n-1}$ and the height of the fluid surface as defined by the height map data at position $t_{n-1}$;
$t_n$ is the nth approximation of the intersection of the first ray and the fluid surface;
t* is a refined approximation of a first true intersection of the first ray with the fluid surface determined based on convergence of the approximation function; and
$\tau_n$ is a convergence parameter corresponding to the nth step of the approximation function, $0 < \tau_n \leq 1$;
compute one or more optical effects for the first pixel based on the contours of the fluid surface and the approximated ray parameter t*, wherein the one or more optical effects comprise a shadow effect based on a volumetric shadow component associated with the first pixel; and
render, by the computing device, the display of the fluid surface based on the computed one or more optical effects for the first pixel.

12. The system of claim 11, wherein the instructions further cause the system to generate the displaced mesh by:
projecting a uniform grid onto a base plane of the water surface from the view point, thereby generating a projected mesh; and
displacing vertices of the projected mesh based on the height map data, thereby generating the displaced mesh.

13. The system of claim 11, wherein the approximation function is clamped at each step and of the form $$t_n = t_{n-1} - \text{clamp}\left[\tau_n \frac{f(t_{n-1})}{f'(t_{n-1})}, -\text{max\_dt}, \text{max\_dt}\right],$$

wherein max_dt is a maximum permitted change per iteration of the approximation function.

14. The system of claim 11, wherein the instructions further cause the system to:
determine approximated subpixel ray parameters for each of a plurality of subpixels associated with the first pixel, wherein determining the corresponding approximated subpixel ray parameters for a first subpixel of the plurality of subpixels is based on further application of the approximation function to the approximated ray parameter t*; and compute one or more optical effects for each subpixel based on the contours of the fluid surface and the corresponding approximated subpixel ray parameters,
wherein rendering the display of the fluid surface is further based on the computed one or more optical effects for the plurality of subpixels.

15. The system of claim 14, wherein determining the approximated subpixel ray parameters for each of the plurality of subpixels other that the first subpixel is based on a prior approximated subpixel ray parameter corresponding to a prior subpixel of the plurality of subpixels, such that:

$$ts[i]_n = ts[i]_{n-1} - \tau_n \frac{f(ts[i]_{n-1})}{f'(ts[i]_{n-1})} \rightarrow ts[i]^*,$$

wherein:
i is the index of a given subpixel of the plurality of subpixels,
$ts[i]_n$ is the nth approximation of the intersection of a second ray, corresponding to the given subpixel, and the fluid surface through the given subpixel,
$f(ts[i]_{n-1})$ is a function that returns the difference of the height of a point on the second ray at position $ts[i]_{n-1}$ and the height of the fluid surface as defined by the height map data at position $ts[i]_{n-1}$;
$ts[i]^*$ is a refined approximation of a first true intersection of the second ray with the fluid surface determined based on convergence of the function; and
$\tau_n$ is a convergence parameter corresponding to the nth step of the approximation function, $0 < \tau_n \leq 1$.

16. A non-transitory computer readable medium comprising instructions that, when executed by one or more processors, cause the one or more processors to:
render a displaced mesh approximating the fluid surface from a perspective of a view point, wherein the displaced mesh is generated based on height map data defining contours associated with the fluid surface;
determine, for each pixel of the display, approximated intersection points for rays cast through each pixel and the water surface, wherein determining the approximated intersection point for a given pixel comprises:
determining, for the given pixel of the display, an initial ray parameter $t_0$ based on an intersection of a first ray cast from the view point through the given pixel with the rendered displaced mesh;
determining the approximated intersection point of the fluid surface and the first ray by iteratively refining the initial ray parameter $t_0$ to generate an approximated ray parameter $t^*$ using an approximation function of the form $$t_n = t_{n-1} - \tau_n \frac{f(t_{n-1})}{f'(t_{n-1})} \rightarrow t^*,$$

wherein:
$f(t_{n-1})$ is a function that returns the difference of the height of a point on the first ray at position $t_{n-1}$ and the height of the fluid surface as defined by the height map data at position $t_{n-1}$;
$t_n$ is the nth approximation of the intersection of the first ray and the fluid surface;
$t^*$ is a refined approximation of a first true intersection of the first ray with the fluid surface determined based on convergence of the approximation function; and $\tau_n$ is a convergence parameter corresponding to the nth step of the approximation function, $0 < \tau_n \leq 1$;
compute one or more optical effects for each pixel based on the contours of the fluid surface and the approximated intersection points; and
render, by the computing device, the display of the fluid surface based on the computed one or more optical effects for each pixel.

17. The computer readable medium of claim 16, wherein the instructions cause the one or more processors to determine approximated subpixel ray parameters for each of a plurality of subpixels associated with the given pixel by causing the one or more processors to:
determine first approximated subpixel ray parameters for a first subpixel of the plurality of subpixels based on the approximated ray parameter t*;
determine corresponding approximated subpixel ray parameters for each subpixel of the plurality of subpixels other that the first subpixel based on prior approximated subpixel ray parameters corresponding to a prior subpixel of the plurality of subpixels;
determine refined approximated subpixel ray parameters for each subpixel of the plurality of subpixels; and
compute one or more optical effects for each subpixel of the plurality of subpixels based on the contours of the fluid surface and the corresponding approximated subpixel ray parameters,
wherein rendering the display of the fluid surface is further based on the computed one or more optical effects for the plurality of subpixels.

18. The computer readable medium of claim 17, wherein the instructions cause the one or more processors to determine the first approximated subpixel ray parameters for the first subpixel by causing the one or more processors to:
determine the first approximated subpixel ray parameters based on the approximated ray parameter t* using a function of the form:

$$ts[0]_0 = \text{clamp}\left[\frac{dotProduct(\overrightarrow{ViewVector}, \overrightarrow{Normal(t^*)})}{dotProduct(\overrightarrow{ViewDir_0}, \overrightarrow{Normal(t^*)})}, \min, \max\right] * t^*,$$

wherein
$ts[0]_0$ is an initial approximation of an intersection of a ray and the fluid surface through the first subpixel,
$\overrightarrow{ViewVector}$ is a direction vector from the view point through the first pixel,
$\overrightarrow{Normal(t^*)}$ is a normal vector of the water surface at a point corresponding to t*,
$\overrightarrow{ViewDir_0}$ is a direction vector from the view point through the first subpixel, and
min and max are constants used to clamp a result of the function.

19. The computer readable medium of claim 17, wherein the instructions cause the one or more processors to determine the corresponding approximated subpixel ray parameters for the each subpixel other than the first subpixel by causing the one or more processors to:
determine the corresponding approximated subpixel ray parameters for each subpixel of the plurality of subpixels other that the first subpixel based on prior approximated subpixel ray parameters using a function of the form:

$$ts[0]_0 = \text{clamp}\left[\frac{dotProduct(\overrightarrow{ViewDir_{i-1}}, \overrightarrow{Normal_{ts[i-1]^*}})}{dotProduct(\overrightarrow{ViewDir_i}, \overrightarrow{Normal_{ts[i-1]^*}})}, \min, \max\right] * ts[i-1]*,$$
$i > 0,$ wherein
- $ts[i]_0$ is an initial approximation of an intersection of a ray through the $i^{th}$ subpixel and the fluid surface,
- $ts[i-1]^*$ is a refined approximation of a first true intersection of the ray through the $(i-1)^{th}$ subpixel with the fluid surface,
- $\overrightarrow{ViewDir_i}$ is a direction vector from the view point through the $i^{th}$ subpixel,
- $\overrightarrow{Normal_{ts[i-1]^*}}$ is a normal vector of the water surface at a point corresponding to $ts[i-1]^*$.

20. The computer readable medium of claim 17, wherein the instructions cause the one or more processors to determine the refined approximated subpixel ray parameters for each subpixel of the plurality of subpixels by causing the one or more processors to: determine the refined approximated subpixel ray parameters for each subpixel of the plurality of subpixels using a second approximation function of the form:

$$ts[i]_n = ts[i]_{n-1} - v_n \frac{f(ts[i]_{n-1})}{f'(ts[i]_{n-1})} \to ts[i]^*,$$

wherein:
- $i$ is the index of a given subpixel of the plurality of subpixels,
- $ts[i]_n$ is the $n^{th}$ approximation of an intersection of a second ray, corresponding to the given subpixel, and the fluid surface,
- $f(ts[i]_{n-1})$ is a function that returns the difference of the height of a point on the second ray at position $ts[i]_{n-1}$ and the height of the fluid surface as defined by the height map data at position $ts[i]_{n-1}$,
- $ts[i]^*$ is the refined approximated subpixel ray parameter of a first true intersection of the second ray with the fluid surface determined based on convergence of the second approximation function; and
- $v_n$ is a convergence parameter corresponding to the $n^{th}$ step of the approximation function, $0 < v_n \leq 1$.

* * * * *